United States Patent
Liu et al.

(10) Patent No.: US 12,194,378 B2
(45) Date of Patent: Jan. 14, 2025

(54) INFORMATION PROCESSING METHOD, SYSTEM, APPARATUS, DEVICE, AND STORAGE MEDIUM

(71) Applicant: Tencent Technology (Shenzhen) Company Limited, Shenzhen (CN)

(72) Inventors: Haiyang Liu, Shenzhen (CN); Minhua Xu, Shenzhen (CN); Qingwen Liu, Shenzhen (CN); Jiang Zhou, Shenzhen (CN); Zhipeng Gong, Shenzhen (CN); Jiaping Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 90 days.

(21) Appl. No.: 17/727,427

(22) Filed: Apr. 22, 2022

(65) Prior Publication Data

US 2022/0241686 A1 Aug. 4, 2022

Related U.S. Application Data

(63) Continuation of application No. PCT/CN2021/077543, filed on Feb. 24, 2021.

(30) Foreign Application Priority Data

Apr. 15, 2020 (CN) .......................... 202010296685.4

(51) Int. Cl.
*A63F 13/355* (2014.01)
*G06F 3/0482* (2013.01)
*H04L 51/52* (2022.01)

(52) U.S. Cl.
CPC .......... *A63F 13/355* (2014.09); *G06F 3/0482* (2013.01); *H04L 51/52* (2022.05)

(58) Field of Classification Search
None
See application file for complete search history.

(56) References Cited

U.S. PATENT DOCUMENTS

| 2012/0028718 A1* | 2/2012 | Barclay | G07F 17/3237 |
| | | | 463/42 |
| 2013/0210530 A1* | 8/2013 | Nguyen | A63F 13/795 |
| | | | 463/42 |

(Continued)

FOREIGN PATENT DOCUMENTS

| CN | 103886008 A | 6/2014 |
| CN | 107158704 A | 9/2017 |

(Continued)

OTHER PUBLICATIONS

International Search Report and Written Opinion received for Application No. PCT/CN2021/077543 mailed May 21, 2021 (English and Chinese languages) (10 pages).

(Continued)

*Primary Examiner* — Jason T Yen
(74) *Attorney, Agent, or Firm* — Crowell & Moring LLP

(57) ABSTRACT

A system/method for a cloud game can improve sharing to a social application that is locally running on a terminal. The system/method improves the scalability of cloud games, provides improved information processing, improves the sociality of cloud games, achieves a high degree of dissemination of cloud games, improves the degree of participation of players in cloud games, and improves the interaction rate of cloud games. The system/method includes logging, by a terminal, in to a cloud game installed in a server based on a trigger instruction of a cloud game login portal, transmitting an operation instruction to the server on which the cloud game is installed, and receiving sharing information includ- (Continued)

ing data to-be-shared transmitted by the server. The terminal can share the data to-be-shared to a target social application.

15 Claims, 9 Drawing Sheets

(56) References Cited

U.S. PATENT DOCUMENTS

| | | | |
|---|---|---|---|
| 2014/0179412 A1* | 6/2014 | Seabolt | A63F 13/335 |
| | | | 463/25 |
| 2014/0179440 A1 | 6/2014 | Perry | |
| 2014/0364228 A1* | 12/2014 | Rimon | A63F 13/355 |
| | | | 463/32 |
| 2015/0128293 A1 | 5/2015 | Hitomi et al. | |
| 2015/0099586 A1 | 8/2015 | Huang et al. | |
| 2015/0298007 A1* | 10/2015 | Agrawal | A63F 13/795 |
| | | | 463/42 |
| 2017/0157516 A1* | 6/2017 | Rudes | A63F 13/35 |
| 2018/0304159 A1* | 10/2018 | Campos | A63F 13/493 |
| 2019/0351323 A1* | 11/2019 | Perry | A63F 13/5372 |
| 2020/0008035 A1 | 1/2020 | Srivatsa et al. | |
| 2020/0094150 A1 | 3/2020 | Miura et al. | |

FOREIGN PATENT DOCUMENTS

| | | |
|---|---|---|
| CN | 110180166 A | 8/2019 |
| CN | 110523079 A | 12/2019 |
| CN | 110572469 A | 12/2019 |
| CN | 110798477 A | 2/2020 |
| CN | 110943959 A | 3/2020 |
| CN | 111494965 A | 8/2020 |
| EP | 2745893 A2 | 6/2014 |
| JP | 6-176131 | 6/1994 |
| JP | 8-36355 | 2/1996 |
| JP | 2007-268286 A | 10/2007 |
| JP | 2014-121610 A | 7/2014 |
| JP | 2014-131736 A | 7/2014 |
| JP | 2018-167030 A | 11/2018 |
| JP | 2020-5244 A | 1/2020 |
| KR | 10-2015-0099829 | 9/2015 |
| KR | 10-2016-0065137 | 6/2016 |
| KR | 10-2018-0008235 A | 1/2018 |
| WO | WO 2014/100770 A2 | 6/2014 |

OTHER PUBLICATIONS

Search Report for China Patent Application No. 2020102966854 mailed May 8, 2021 (Chinese language only) (13 pages).
Search Report for China Patent Application No. 2020102966854 mailed Mar. 24, 2021 (Chinese language only) (12 pages).
Internet page, http://www.pc6.com/video/760.html (2 pages).
Office Action received in related Japanese Patent Application No. 2022-533194 dated Jul. 24, 2023, including English translation, 9 pgs.
Hiroo, Yoshino, et al., "Animal Crossing, Happy Home Designer Complete Guide," including English summary, pp. 11, 27, and 137 (Nintendo Editorial Department, 2015).
Supplementary European Search Report, Dec. 16, 2022, pp. 1-13, issued in European Application 21788658.9, European Patent Office, Munich, Germany.
Office Action issued on Korean Application 10-2022-7013259 on Apr. 12, 2024, 8 pages.
Translation of Korean Application 10-2022-7013259 dated Apr. 12, 2024, 9 pages.
Japanese Office Action with English translation, dated Jun. 6, 2024, pp. 1-10, issued in Japanese Patent Application No. 2022-533194.
Korean Office Action with English translation, Jul. 16, 2024, pp. 1-18, issued in Korean Patent Application No. 10-2022-7031619, Intellectual Property Office.

* cited by examiner (1)

(2)

(3)

(4)

INFORMATION PROCESSING METHOD, SYSTEM, APPARATUS, DEVICE, AND STORAGE MEDIUM

RELATED APPLICATION

This application is a continuation of PCT Application No. PCT/CN2021/077543, filed Feb. 24, 2021, published as WO 2021/208599A1, entitled "INFORMATION PROCESSING METHOD, SYSTEM, APPARATUS, DEVICE, AND STORAGE MEDIUM", which claims priority to Chinese Patent Application No. 202010296685.4, entitled "INFORMATION PROCESSING METHOD, SYSTEM, APPARATUS, DEVICE, AND STORAGE MEDIUM" and filed on Apr. 15, 2020, both of which are incorporated herein by reference in their entirety.

FIELD OF THE TECHNOLOGY

Embodiments of this application relate to the field of computer technologies, and in particular, to an information processing method, system, apparatus, device, and storage medium.

BACKGROUND OF THE DISCLOSURE

Cloud gaming, also known as game-on-demand, is an online gaming technology based on cloud computing technology. The cloud gaming technology enables terminal devices with relatively limited graphics processing and data computing capabilities to run high-quality games. In a cloud gaming scenario, the game does not run on a player's terminal, but on a server, and the server renders a game scene as an audio and video stream and transmits same to the player's terminal through a network. The player's terminal does not need to have powerful graphics computing and data processing capabilities, but just a basic streaming media playback capability and an ability to obtain instructions inputted by the player and transmit the instructions to the server. Due to cloud games being executed in a server, there may be difficulties sharing on social applications and achieving social interaction. As a result, cloud games have a low degree of dissemination and poor information processing effects.

SUMMARY

Embodiments of this application provide an information processing method, system, apparatus, device, and storage medium, which can improve the degree of dissemination of cloud games. The technical solutions and embodiments are as follows.

One embodiment provides an information processing method, applicable to a terminal, the method including:
   logging in to a cloud game installed in a server based on a trigger instruction of a cloud game login portal, and obtaining an operation instruction during the cloud game;
   transmitting the operation instruction to the server on which the cloud game is installed, so that the server generates operation information based on the operation instruction;
   parsing data to-be-shared from the operation information in response to the operation information being information of a sharing type, generating sharing information including the data to-be-shared, and transmitting the sharing information including the data to-be-shared to the terminal; and
   receiving the sharing information including the data to-be-shared transmitted by the server, and sharing the data to-be-shared to a target social application.

Another embodiment provides an information processing method, applicable to a server, the method including:
   receiving an operation instruction during a cloud game from a terminal;
   generating operation information based on the operation instruction;
   parsing data to-be-shared from the operation information in response to the operation information being information of a shareable type, and generating sharing information including the data to-be-shared; and
   transmitting the sharing information including the data to-be-shared to the terminal, so that the terminal shares the data to-be-shared to a target social application.

Another embodiment provides an information processing system, including a terminal and a server,
   the terminal being configured to log in to a cloud game installed in the server based on a trigger instruction of a cloud game login portal, and obtaining an operation instruction during the cloud game; and transmit the operation instruction to the server on which the cloud game is installed;
   the server being configured to receive an operation instruction during a cloud game from the terminal; generate operation information based on the operation instruction; parse data to-be-shared from the operation information in response to the operation information being information of a shareable type, and generate sharing information including the data to-be-shared; and transmit the sharing information including the data to-be-shared to the terminal; and
   the terminal being further configured to receive the sharing information including the data to-be-shared transmitted by the server, and sharing the data to-be-shared to a target social application.

Another embodiment provides an information processing apparatus, including:
   an obtaining module, configured to log in to a cloud game installed in a server based on a trigger instruction of a cloud game login portal, and obtaining an operation instruction during the cloud game;
   a transmission module, configured to transmit the operation instruction to the server on which the cloud game is installed, so that the server generates operation information based on the operation instruction; and parse data to-be-shared from the operation information in response to the operation information being information of a shareable type, generate sharing information including the data to-be-shared, and transmit the sharing information including the data to-be-shared to a terminal;
   a receiving module, configured to receive the sharing information including the data to-be-shared transmitted by the server; and
   a sharing module, configured to share the data to-be-shared to a target social application.

Another embodiment provides an information processing apparatus, including:
   a receiving module, configured to receive an operation instruction during a cloud game from a terminal;
   a generation module, configured to generate operation information based on the operation instruction;

a parsing module, configured to parse data to-be-shared from the operation information in response to the operation information being information of a shareable type;

the generation module being further configured to generate sharing information including the data to-be-shared; and a transmission module, configured to transmit the sharing information including the data to-be-shared to the terminal, so that the terminal shares the data to-be-shared to a target social application.

Another embodiment provides a computer device, including a processor and a memory, the memory storing at least one program code, the at least program code being loaded and executed by the processor to implement the information processing method according to any one of the above aspects.

Another embodiment provides a non-transitory computer-readable storage medium, storing at least one program code, the at least program code being loaded and executed by a processor to implement the information processing method according to any one of the above embodiments.

Another embodiment provides a computer program product, storing at least one computer program, the at least computer program being loaded and executed by a processor to implement the information processing method according to any one of the above embodiments.

When the operation information is information of the shareable type, the server parses the data to-be-shared from the operation information, and transmits the sharing information including the data to-be-shared to the terminal, so that the terminal shares the data to-be-shared to the social application. In this information processing process, a step of determining whether the operation information is information of a shareable type is additionally executed by the server, and the server transmits the data to-be-shared parsed from the operation information of the shareable type to the terminal, so that the terminal shares the data to-be-shared to the social application on the terminal. By this process, data to-be-shared in a cloud game can be shared to a social application locally running on a terminal, which improves the scalability of cloud games, provides a good information processing effect, improves the sociality of cloud games, achieves a high degree of dissemination of cloud games, improves the degree of participation of players in cloud games, and improves the interaction rate of cloud games.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application. A person of ordinary skill in the art may still derive other drawings from these accompanying drawings without creative efforts.

DESCRIPTION OF EMBODIMENTS

Figure 1:
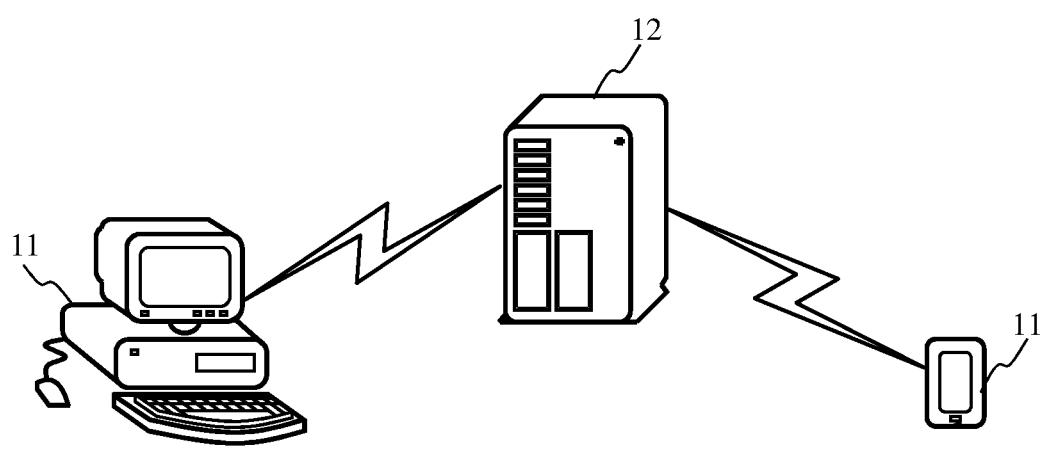
FIG. 1 is a schematic diagram of an implementation environment of an information processing method according to one embodiment one embodiment.

To make objectives, technical solutions, and advantages of this application clearer, the following further describes implementations of this application in detail with reference to the accompanying drawings.

First, several terms involved in this application are explained.

Cloud computing: It is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid per use. Cloud computing has grown rapidly with the development of the Internet, real-time data streaming, the diversification of connected devices, and the need for search services, social networking, mobile commerce, and open collaboration. Different from conventional parallel/distributed computing, the advent of cloud computing will promote revolutionary changes in the entire Internet model and enterprise management model.

Cloud gaming, also known as game-on-demand, is an online gaming technology based on cloud computing technology. The cloud gaming technology enables terminal devices with relatively limited graphics processing and data computing capabilities to run high-quality games. In a cloud gaming scenario, the game does not run on a player's terminal, but on a cloud server, and the cloud server renders a game scene as an audio and video stream and transmits same to the player's terminal through a network. The player's terminal does not need to have powerful graphics computing and data processing capabilities, but only needs to have a basic streaming media playback capability and an ability to obtain instructions inputted by the player and transmit the instructions to the cloud server.

MSDK (Mobile Software Development Kit): It is a public component and service library provided for independent research and development and third-party mobile game development teams to help mobile game application developers quickly access designated platforms and operate online. The MSDK is directly connected to major platforms of game applications, so that game applications can easily enjoy the massive data of the major platforms. The MSDK provides many basic services for mobile game applications, including: login, friends chain, sharing, points system, activity center, and the like.

Intent information: mainly used to solve the communication between the various components of the Android system. The Intent information is responsible for describing an action of an operation in the application, data involved in the action, and additional data. The Android system is responsible for finding the corresponding component according to the description of the Intent information, passing the Intent information to the invoked component, and completing the invocation of the component. Therefore, the Intent information plays the role of a media intermediary, which is specially used for providing information related to mutual invocation of the components, to realize the decoupling between the invoking component and the invoked component.

Activity component: It is one of the four major types of components of the Android system: activities, services, content providers, and broadcast receivers. Many specific needs in the Android development process need to be determined and executed according to different life cycles of the Activity components. The Activity component is an application component that allows users to interact with the interface provided by the Activity component to perform operations such as making a phone call, taking a photo, transmitting an email, or viewing a map. For example, in an Android application, an Activity component is a separate interface on which some controls can be displayed, and can also monitor and process user events and respond to user events. Activity components communicate through Intent information.

AMS (Activity Manager Service): It is a service end for the management of the Activity components in the Android system, and is used for managing various behaviors of the Activity components, such as controlling the life cycles of the Activity components, dispatching message events, and low memory management, etc. The AMS implements an IBinder (object) interface and can be used for inter-process communication.

Processing services corresponding to operation information of a cloud game are executed in a server, and in addition to the cloud game, a social application may also be installed in the server. When the operation information is of a shareable type, the data to-be-shared may be shared to the social application running on the server, but may be limited for other social applications actually used by the player. However, social applications installed in the server are usually limited for its sharing function due to privacy concern. In this example, it is difficult to achieve the social interaction expected by the player. Embodiments described below can improve this interaction.

With the rapid development of the game industry, terminal technology, and network bandwidth in recent years, online games have become an indispensable Internet application in people's lives. In addition, the maturity of cloud computing technology has given birth to the "thin terminal-cloud" service model. In this model, users' terminal devices are interconnected with high-performance cloud computing resources, and can enjoy high-quality cloud services. The application of this model to online gaming breeds a new type of cloud computing service—cloud gaming. Through cloud gaming technology, players can access games at any place and at any time through any terminal device (such as a personal computer, a tablet computer, a mobile phone, etc.), making it easier for players to play games. Currently, how to share data in a cloud game to a social application running locally on the player's terminal is a problem that needs to be solved.

Therefore, one embodiment provides an information processing method. Referring to FIG. 1, FIG. 1 is a schematic diagram of an implementation environment of an information processing method according to one embodiment. The implementation environment includes a terminal 11 and a server 12.

The terminal 11 is configured to access a cloud game, and a player can directly access the cloud game using the terminal 11. The terminal 11 is configured to obtain an operation instruction of the player during the cloud game, and transmit the operation instruction to the server 12. A cloud game is installed on the server 12. The server 12 is configured to generate operation information according to the operation instruction transmitted by the terminal 11. When determining that the operation information is information of shareable type, the server 12 transmits sharing information including data to-be-shared to the terminal 11. The terminal 11 shares the data to-be-shared to a local social application.

In one implementation or embodiment, the terminal 11 is a smartphone, a tablet computer, a notebook computer, a desktop computer, a smart speaker, a smartwatch, or the like, but these are merely examples and there may be additional types of terminals. The server 12 is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal 11 and the server 12 may be directly or indirectly connected through wired or wireless communication, which includes other forms of communication.

It is to be understood by a person skilled in the art that the terminal 11 and the server 12 are merely examples, and other existing or future terminals or servers that are applicable to this application also fall within the scope of protection of this application, and therefore are incorporated herein by reference.

Figure 2:
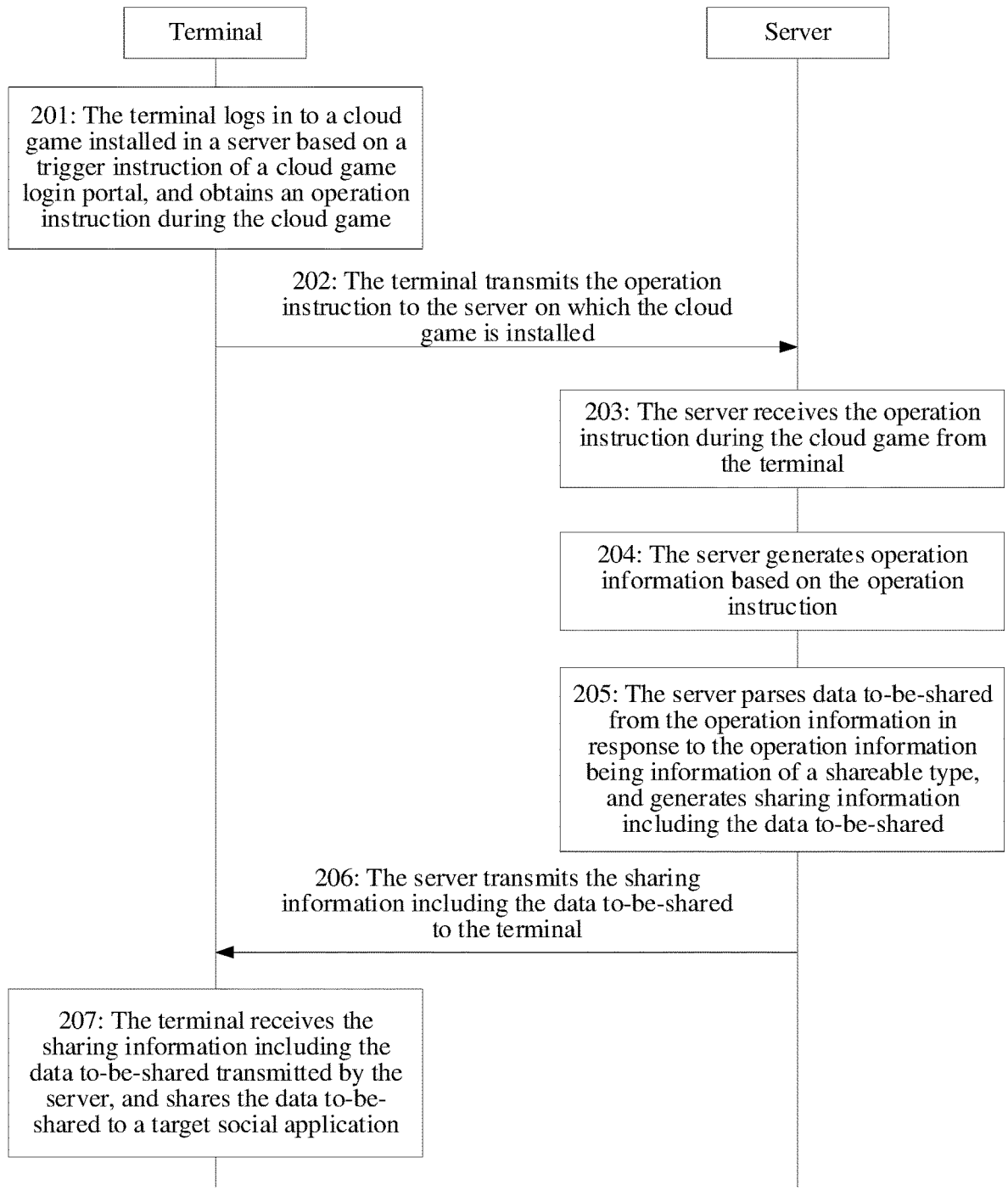
FIG. 2 is a flowchart of an information processing method according to one embodiment one embodiment.

Based on the implementation environment shown in FIG. 1, one embodiment provides an information processing method. The method is applicable to, for example, an interaction process between the terminal 11 and the server 12. As shown in FIG. 2, the method provided in this embodiment of this application includes the following steps 201 to 207.

In step 201, the terminal logs in to a cloud game installed in the server based on a trigger instruction of a cloud game login portal, and obtaining an operation instruction during the cloud game.

The terminal is configured to access the cloud game. That is to say, a player can directly access the cloud game installed in the server using the terminal. In one implementation or embodiment, a game application for accessing the cloud game is installed in the terminal, and the player can access the cloud game in the game application. The cloud game is not installed in the terminal, but in the server. The terminal can provide a cloud game login portal, and the player can access the cloud game by triggering the cloud game login portal. When the player triggers the cloud game login portal, the terminal obtains a trigger instruction of the cloud game login portal, and can log in to the cloud game installed in the server based on the trigger instruction of the cloud game login portal.

In one implementation or embodiment, the process that the terminal logs in to the cloud game installed in the server based on the trigger instruction of the cloud game login portal is: displaying, by the terminal, a cloud game login page based on the trigger instruction of the cloud game login portal; obtaining login information on the cloud game login page, and transmitting the login information to the server for verification; and logging, by the terminal, in to the cloud game installed in the server in response to the server returning a response indicating that the verification is passed. A login information input box is displayed on the cloud game login page, and the player can input login information in the login information input box, so that the terminal can obtain the login information on the cloud game login page. The type and quantity of the login information input boxes displayed on the cloud game login page are just examples and in other embodiments may vary, and are related to the type of the cloud game that needs to be logged in. For example, the login information input box displayed on the cloud game login page includes a login account input box and a login password input box.

After logging in to the cloud game, the terminal can display a game page of the cloud game for the player to experience the cloud game on the terminal. In the process of experiencing the cloud game on the terminal, the player can trigger a triggerable control on the game page of the cloud game, and then the terminal obtains an operation instruction during the cloud game according to the trigger operation of the player. In the embodiments of this application, the form of the triggerable control may vary. For example, the triggerable control is a triggerable button, a triggerable icon, or the like. Different triggerable controls may correspond to different types of trigger operations. In the embodiments of this application, the type of the trigger operation that the player can generate on the game page of the cloud game may vary. For example, the trigger operation that the player can generate on the game page of the cloud game includes one or more of a share operation, a confirm operation, a skill releasing operation, etc. In other embodiments, the functions of the trigger operation may vary.

For example, the trigger operation generated by the player on the game page of the cloud game is a share operation. In this example, when the player triggers the share operation on the game page of the cloud game, the operation instruction during the cloud game that is obtained by the terminal on the game page is actually a share instruction. In one implementation or embodiment, the share operation is triggered by clicking/tapping of a share control (a share button, a share icon, etc.).

Figure 3:
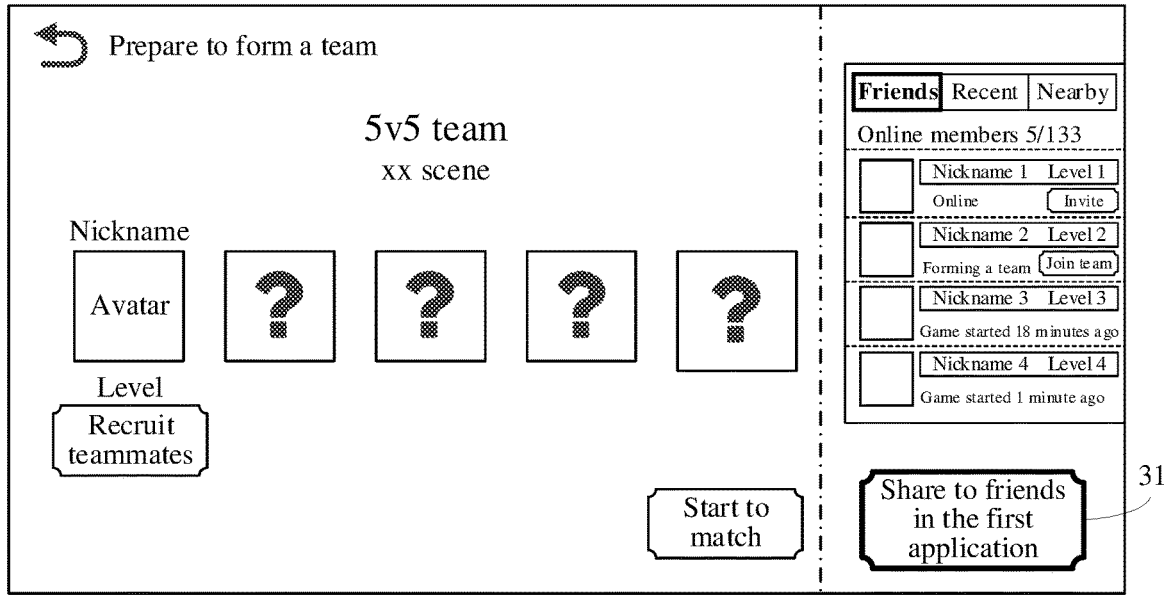
FIG. 3 is a schematic diagram of a game page of a cloud game according to one embodiment one embodiment.

There may be one or more types of share controls, which can be set according to the type of cloud game and may vary in other embodiments. For example, the type of the share control includes at least one of sharing to a friend in a first social application, sharing to an interactive community in the first social application, sharing to a friend in a second social application, or sharing to an interactive community in the second social application. The first social application and the second social application are different social applications. Social applications may include applications that allow different objects to socialize by chatting, voice messages, sharing pictures, sharing interaction information, or other methods. For example, when the type of share control includes sharing to a friend in the first social application, the game page of the cloud game is as shown in FIG. 3, where a share control 31 is displayed in FIG. 3. When the player triggers the share control 31, the operation instruction obtained by the terminal is actually an operation instruction of sharing to a friend in the first social application.

In one implementation or embodiment, timing for the player to trigger the share operation includes one or more of triggering the share operation when needing to invite a friend to join the cloud game; and triggering the share operation when needing to share a game result of the cloud game. Different timings may correspond to the same or different types of triggerable share controls. The types described here just examples and in other embodiments may vary. The sharing purpose of the share operation varies with different timings. For example, when triggering the share operation when needing to invite a friend to join the cloud game, the sharing purpose of the share operation is to share an invitation link; when triggering the share operation when needing to share the game result of the cloud game, the sharing purpose of the share operation is to share a picture containing the game result.

In an example embodiment, when the player triggers the share operation by clicking/tapping on the share control, the operation instruction during the cloud game that is obtained by the terminal carries information indicating a sharing target. For example, when the player triggers the share operation by clicking/tapping the share control for sharing to a friend in the first social application, the sharing target is the friend in the first social application; when the player triggers the share operation by clicking/tapping the share control for sharing to an interactive community in the first social application, the sharing target is the interactive community in the first social application.

Because the cloud game is installed in the server, the terminal cannot identify the type of the operation instruction obtained. Regardless of the type of the operation instruction obtained, the terminal transmits the operation instruction to the server, for the server to further process the operation instruction.

In step 202, the terminal transmits the operation instruction to the server on which the cloud game is installed.

After obtaining the operation instruction during the cloud game, the terminal transmits the operation instruction to the server on which the cloud game is installed, so that the server processes the operation instruction. In one implementation or embodiment, the operation instruction during the cloud game may be a share instruction. In an example embodiment, the operation instruction during the cloud game may also be a confirmation instruction, a skill releasing instruction, etc.

In some embodiments, the terminal transmits the operation instruction to the server on which the cloud game is installed in at least one of the following two manners:

Manner I: The terminal directly transmits the operation instruction to the server on which the cloud game is installed.

In Manner I, a network connection can be directly established between the terminal and the server to transmit information directly. In Manner I, the efficiency of information transmission between the terminal and the server is relatively high. These manners are just examples and in other embodiments may vary.

For example, a persistent connection can be established directly between the terminal and the server. For example, the persistent connection is established based on Websocket. In the process of establishing a persistent connection based on Websocket, the terminal and the server only need to perform a handshake action. After establishing a persistent connection based on Websocket, the terminal and the server can push information to each other at any time. When establishing a persistent connection based on Websocket, header information exchanged between the server and the terminal is very small, which is conducive to further improving the efficiency of information transmission.

Manner II: The terminal transmits the operation instruction to a gateway, and the gateway transmits the operation instruction to the server.

In Manner II, a network connection is established between the terminal and the server through the gateway, that is, information transmitted between the terminal and the server needs to be relayed by the gateway. The gateway can perform security verification on the transmitted information, thereby improving the security and reliability of information transmission between the terminal and the server.

In one implementation or embodiment, a persistent connection is established between the terminal and the server through the gateway. For example, the persistent connection is a persistent connection established based on Web socket.

To transmit an operation instruction, the terminal needs to encapsulate the operation instruction into an information format supported by the transmission process, so as to ensure the effectiveness of information transmission.

In step 203, the server receives the operation instruction during the cloud game from the terminal.

The cloud game is installed on the server, and after the terminal transmits the operation instruction during the cloud game to the server, the server receives the operation instruction during the cloud game from the terminal.

In one implementation or embodiment, corresponding to the two manners in which the terminal transmits the operation instruction to the server, the server receives the operation instruction during the cloud game from the terminal in either of the following two manners:

Manner 1: The server receives the operation instruction during the cloud game that is directly transmitted by the terminal.

Manner 1 occurs in the example where the terminal directly transmits the operation instruction to the server, and a network connection is directly established between the terminal and the server.

Manner 2: The server receives the operation instruction during the cloud game that is transmitted by the terminal through a gateway.

Manner 2 occurs in the example where the terminal transmits the operation instruction to the gateway and the gateway transmits the operation instruction to the server, and a network connection is established between the terminal and the server through the gateway.

In step 204, the server generates operation information based on the operation instruction.

After receiving the operation instruction during the cloud game that is transmitted by the terminal, the server generates operation information based on the operation instruction. The information format of the operation information is an information format supported by an operating system of the server (for example, iOS or Android), so that the operating system of the server processes the operation information. The cloud game is installed in the operating system of the server. This embodiment of this application is described by using an example where the operating system of the server is an Android system. In an example embodiment, an operating system of the terminal for accessing the cloud game is consistent with the operating system of the server, so as to ensure that functions of the cloud game can be normally implemented on the terminal and the game page can be normally displayed on the terminal. That is to say, when the operating system of the terminal for accessing the cloud game is an Android system, the operating system of the server is also an Android system.

The information format supported by the operating system of the server refers to an information format that can be identified among various components in the operating system of the server. For example, in the Android system, the supported information format is the Intent information format.

In one implementation or embodiment, the process that the server generates the operation information based on the operation instruction is: filling, by the server, data related to the operation instruction according to the Intent information format to obtain the operation information. Different operation instructions correspond to different operation information, but the different operation information is in the same information format, i.e., the Intent information format. In the embodiments of this application, based on the Intent information format, each part of information that is to be included in the generated operation information can be preset according to the characteristics of the cloud game, so that subsequently the type of the operation information can be identified more conveniently. For example, the operation information in the Intent information format includes two parts: an operation target and additional data. Specific contents of at least one of the operation target or the additional data vary with the different operation information corresponding to different operation instructions.

For example, when the operation instruction is a share instruction, the operation target included in the operation information refers to a sharing target, where the sharing target is used for indicating a social application to be shared and an interaction page to be redirected to in the social application to be shared. The additional data included in the operation information refers to data to-be-shared. The format of the data to-be-shared may be set according to experience or flexibly adjusted according to application scenarios in different embodiments. For example, the data to-be-shared includes at least one of a theme, detailed data, or description information.

For example, the data to-be-shared varies with different sharing purposes. For example, when the sharing purpose is to share an invitation link, the detailed data in the data to-be-shared refers to the invitation link; when the sharing purpose is to share a picture containing the game result, the detailed data in the data to-be-shared refers to the data obtained by encoding the picture containing the game result.

For example, when the sharing purpose is to share an invitation link, the data to-be-shared is as follows:

```
{
  title=demo, //theme of sharing
  detail_url=http://gamecenter.qq.com/gcjump?appid=123 . . . ,
  //invitation link
shared
  desc=Come and join to gang up! , //description information shared
}
```

In one implementation or embodiment, the Intent information format is a key-value pair format. For example, identification information of the operation information is used as a key, and the specific content of the operation information is used as a value. Such a key-value pair format allows for fast query, can store a large data volume, and supports high concurrency. For the operation information corresponding to different operation instructions, the key-value pair may be determined in different manners. For example, when the operation instruction is a share instruction, the key-value pair is determined according to a sharing interface opened by the social application to be shared.

In step 205, the server parses data to-be-shared from the operation information in response to the operation information being information of a shareable type, and generates sharing information including the data to-be-shared.

After generating the operation information, the server determines whether the operation information is information of the shareable type. When the operation information is information of the shareable type, the server transmits the sharing information including the data to-be-shared to the terminal according to step 205 and the subsequent step 206, so as to realize the sharing of the data to-be-shared of the cloud game to the social application of the terminal.

In one implementation or embodiment, the server determines whether the operation information is information of the shareable type in at least the following two manners:

Manner I: The server verifies whether the operation information is of the shareable type by using the operating system, and determines whether the operation information is information of the shareable type according to a result of the verification. This manner is just one example and in other embodiments may vary.

The information format of the operation information is an information format supported by the operating system of the server, and the operating system of the server can verify whether the type of the operation information is the shareable type. In one implementation or embodiment, a service component is integrated in the cloud game, and before the server verifies whether the operation information is of the shareable type by using the operating system, the server first transmits the operation information to the operating system through the service component in the cloud game. The service component can communicate with the operating system. For example, the service component is the MSDK. For example, the service component communicates with the operating system through an interface, where different interfaces are used for transmitting different types of information. For example, a sharing interface in the service component is used for transmitting information of the shareable type to the operating system.

In one implementation or embodiment, the process that the server verifies whether the operation information is of the shareable type by using the operating system is: a process of identifying, by the server, whether the operation information is information of the shareable type by using the operating system. In one implementation or embodiment, the operation information includes an operation target, and the process of verifying whether the operation information is of the shareable type by using the operating system is: identifying whether the operation target in the operation information is a sharing target by using the operating system. When the operation target in the operation information is a sharing target, it means that the verification of whether the operation information is of the shareable type is passed. When the operation target in the operation information is not a sharing target, it means that the verification of whether the operation information is of the shareable type is not passed.

In one implementation or embodiment, the process that the server verifies whether the operation information is of the shareable type by using the operating system includes the following two steps:

Step 1: Initiate a processing request for the operation information by using a first function in a first component of the operating system, the processing request carrying the operation information.

In an example embodiment, where the operating system is an Android system, the first component of the operating system refers to an Activity component of the Android system, and the first function in the first component refers to a startActivityForResult function. In one implementation or embodiment, the process of initiating a processing request for the operation information by using a first function in a first component of the operating system is: filling the first function in the first component with the operation information by using the operating system, to obtain a filled first function, initiating a request for the filled first function by using the operating system, and using the request for the filled first function as the processing request for the operation information. The processing request is used for other components of the operating system to further process the operation information. The processing request carries the operation information.

Step 2: Verify whether the operation information carried in the processing request is of the shareable type by using a second function in a second component of the operating system.

In an example embodiment, where the operating system is an Android system, the second component of the operating system refers to an Instrumentation component of the Android system, and the second function in the second component refers to an execStartActivity function. The second function in the second component includes verification logic for verifying whether the operation information carried in the processing request initiated by the operating system is of the shareable type. For example, the verification logic included in the second function is used for verifying whether the operation information matches information about the shareable type.

It can be verified whether the operation information carried in the processing request is of the shareable type by using the second function in the second component of the operating system. In one implementation or embodiment, when the operation information includes an operation target and the second function includes candidate sharing targets, the process of verifying whether the operation information is of the shareable type by using the second function is: comparing the operation target in the operation information with the candidate sharing targets by using the second function. When the operation target in the operation information is consistent with any candidate sharing target, it means that the verification of whether the operation information is of the shareable type is passed; When the operation target in the operation information is inconsistent with all the candidate sharing targets, it means that the verification of whether the operation information is of the shareable type is not passed.

In another possible implementation, the second function includes a specified data format of each part of information included in the information of the shareable type. For example, the information of the shareable type includes two parts: a sharing target and data to-be-shared, where a specified data format of the sharing target includes data for indicating the social application to be shared and data for indicating the interaction page to be redirected to, and a specified data format of the data to-be-shared includes data for indicating a theme, detailed data, and description information, respectively. In this example, the process of verifying whether the operation information is of the shareable type by using the second function is: comparing the data format of the information included in the operation information with the specified data format of each part of information included in the information of the shareable type by using the second function. When the information included in the operation information includes information of the same data format as the specified data format of each part of information included in the information of the shareable type, it means that the verification of whether the operation information is of the shareable type is passed. When the information included in the operation information does not include information of the same data format as the specified data format of each part of information included in the information of the shareable type, it means that the verification of whether the operation information is of the shareable type is not passed.

The result of the verification of whether the operation information is of the shareable type by using the operating system of the server is either of the following two results:

Result 1: The verification of whether the operation information is of the shareable type is passed.

When the operation information matches information of the shareable type, it means that the verification of whether the operation information is of the shareable type is passed.

Result 2: The verification of whether the operation information is of the shareable type is not passed.

When the operation information matches information of the shareable type, it means that the verification of whether the operation information is of the shareable type is passed.

The process of determining whether the operation information is information of the shareable type according to the result of the verification is: determining that the operation information is information of the shareable type in response to the verification being passed; and determining that the operation information is information of a non-shareable type in response to the verification being not passed.

In Manner I, because the determining whether the operation information is of the shareable type by using the operating system is performed at the operating system level, all the operation information of the shareable type can be identified, so that the success rate of subsequently sharing the data to-be-shared to the social application of the terminal almost reaches 100 percent.

Manner II: The cloud game integrates a service component and an interception component, and the server performs interception processing on a sharing interface in the service component by using the interception component, and determines whether the operation information is information of the shareable type depending on whether the operation information can be intercepted at the sharing interface.

The service component communicates with the operating system. For example, the service component is the MSDK. The interception component is configured to perform interception processing on a certain interface or a certain type of interface in the service component, so that information cannot be transmitted to the operating system through this interface or this type of interface. In this embodiment of this application, the interception component is configured to perform interception processing on the sharing interface in the service component, so that information of the shareable type cannot be transmitted to the operating system through the sharing interface. The sharing interface is an interface or a type of interfaces in the service component for receiving a share instruction and transmitting information of the shareable type to the operating system. By performing interception processing on the sharing interface in the service component by using the interception component, information of the shareable type can be intercepted.

In an example embodiment, the way that the interception component performs interception processing on the sharing interface refers to replacing a certain part or all of the original program code of the sharing interface with new program code to change the transmission mode of the sharing interface, so that the sharing interface no longer transmits information of the shareable type to the operating system. After interception processing is performed on the sharing interface, information of the shareable type can be intercepted.

After interception processing is performed on the sharing interface in the service component by using the interception component, it can be determined whether the operation information is information of the shareable type depending on whether the operation information can be intercepted at the sharing interface. In one implementation or embodiment, the process of determining whether the operation information is information of the shareable type depending on whether the operation information can be intercepted at the sharing interface is: determining that the operation information is information of the shareable type in response to intercepting the operation information at the sharing interface; and determining that the operation information is information of the non-shareable type in response to not intercepting the operation information at the sharing interface.

In Manner II, the process of determining whether the operation information is of the shareable type is performed at the cloud game level without calling the operating system, which is fast and convenient.

In the related art, the server does not perform the process of determining whether the operation information is of the shareable type, but directly uses the operating system to process the entire service corresponding to the operation information. In this embodiment of this application, by adding the step of determining whether the operation information is of the shareable type, information of the shareable type can be identified, so that the subsequent sharing of the data to-be-shared in the sharing information to the social application of the terminal can be realized.

Whether the operation information is information of the shareable type can be determined by either the above Manner I or Manner II. When the result of the determining is that the operation information is information of the shareable type, the server parses data to-be-shared from the operation information, and generates sharing information including the data to-be-shared. The information format of the sharing information is an information format supported by the transmission process.

In an example embodiment, the operation information includes two parts: an operation target and additional data. When the operation information is information of the shareable type, the operation target included in the operation information refers to a sharing target, where the sharing target is used for indicating a social application to be shared and an interaction page to be redirected to in the social application to be shared. The additional data included in the operation information refers to the data to-be-shared. When it is determined that the operation information is information of the shareable type, the data to-be-shared can be parsed from the operation information. In one implementation or embodiment, when the operating system is used to determine whether the operation information is of the shareable type, the second function in the second component of the operating system can be used to parse the data to-be-shared from the operation information. For example, the process of parsing the data to-be-shared from the operation information refers to: extracting Bundle data from the operation information in the Intent information format, and using the extracted Bundle data as the data to-be-shared.

After parsing the data to-be-shared from the operation information, the server generates the sharing information including the data to-be-shared, where the information format of the sharing information is an information format supported by the transmission process. In one implementation or embodiment, the information format of the sharing information is as follows:

```
Message { //Define the message body
    enum CmdType //Define enumeration of message types
    CMD_SHARE_RESULT_TO_GAME=1; //Define the
    message type for
sharing the cloud game result as 1
    }
    CmdType type, // Type of message
    String data, //Specific content of the message
    (including data to-be-shared)
}
```

The data to-be-shared is included in "data" in "String data" for indicating the specific content of the message. In addition to the data to-be-shared, "data" can also include information for indicating the sharing target. For example, the information for indicating the sharing target includes information of the social application to be shared and information of the interaction page to be redirected to in the social application to be shared. For example, when the share instruction based on which the operation information is generated is a share instruction generated by triggering a share control for sharing to a friend in the first social application, the social application to be shared is the first social application, and the interaction page to be redirected to in the social application to be shared is a friend selection page in the first social application. When the share instruction based on which the operation information is generated is a share instruction generated by triggering the share control for sharing an interactive community in the first social application, the social application to be shared is the first social application, and the interaction page to be redirected to in the social application to be shared is an interactive information publishing page in the first social application.

For example, the content of "data" in "String data" is as follows:

```
{
    shareType:[qq | wechat], //Information of the social application to be shared
    shareTarget:[to_fri | to_qzone | to_wexin], //Information of the interaction page
to be redirected to in the social application to be shared
    { //Data to-be-shared
        title=demo, //theme of sharing
        detail_url=http://gamecenter.qq.com/gcjump?appid=123 . . . , //invitation link
shared
        desc=Come and join to gang up! , //description information shared
    }
}
```

When the operation information is information of the shareable type, the server generates the sharing information including the data to-be-shared based on step 205, and then executes step 206. In one implementation or embodiment, the operation information may also be information of a non-shareable type. When the operation information is information of the non-shareable type, the server executes a processing service corresponding to the operation information in response to the operation information being information of the non-shareable type, to obtain a processing result; and transmits the processing result to the terminal.

When the operation information is information of the non-shareable type, the processing service corresponding to the operation information is executed in the server. In one implementation or embodiment, executing the processing service corresponding to the operation information refers to opening a target game page corresponding to the operation information.

The target game page corresponding to the operation information may vary with the operation instructions based on which the operation information is generated. For example, when the operation instruction based on which the operation information is generated is a confirmation instruction, the target game page corresponding to the operation information refers to a game page associated with the confirmation instruction. When the operation instruction based on which the operation information is generated is a skill releasing instruction, the target game page corresponding to the operation information refers to a game page after skill releasing.

In one implementation or embodiment, the server executes the processing service corresponding to the operation information in the following manner: the server executes the processing service corresponding to the operation information by using a start function in a management component of the operating system. That is to say, the target game page corresponding to the operation information is opened by using the start function in the management component of the operating system. For example, where the operating system is an Android system, the management component of the operating system refers to the AMS component of the Android system, and the start function in the management component refers to the startActivity function.

Figure 4:
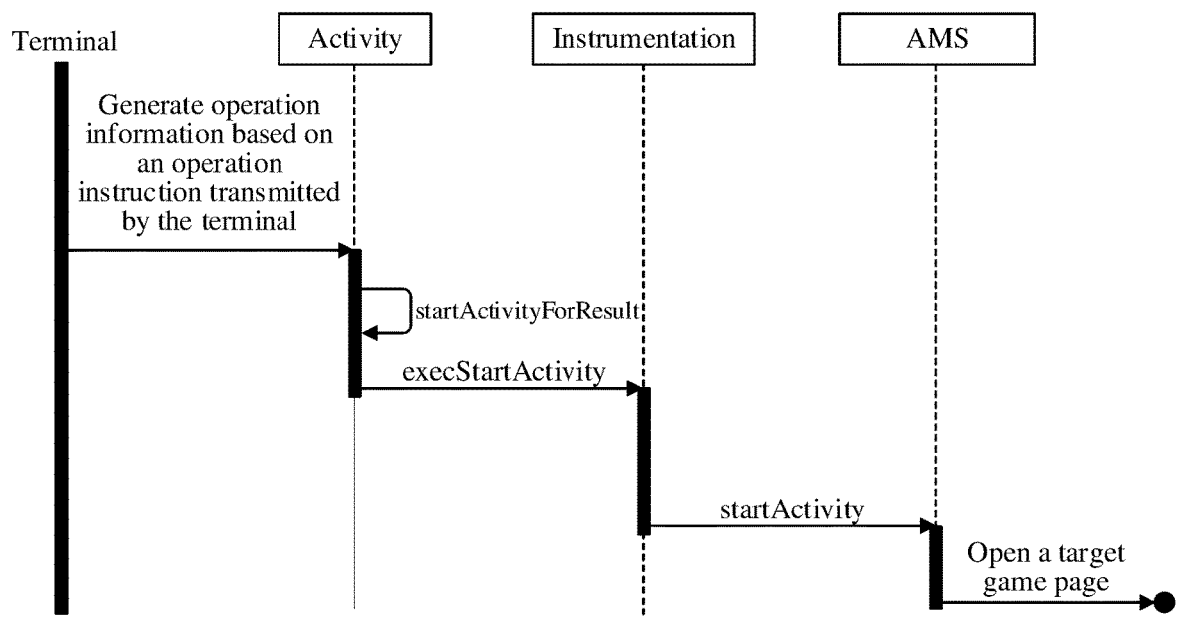
FIG. 4 is a schematic diagram of a process of processing operation information by a server according to one embodiment one embodiment.

For example, where the operation information is information of the non-shareable type, the process of processing the operation information by the server is as shown in FIG. 4. Operation information is generated based on the operation instruction transmitted by the terminal. A processing request for the operation information is initiated by using the startActivityForResult function in the Activity component. It is verified whether the operation information carried in the processing request is of the shareable type by using the execStartActivity function in the Instrumentation component. When the verification is not passed, i.e., when the operation information is information of the non-shareable type, the target game page corresponding to the operation information is opened by using the startActivity function in the AMS component.

After executing the processing service corresponding to the operation information, the server obtains a processing result, and then transmits the processing result to the terminal. For example, when executing the processing service corresponding to the operation information refers to opening the target game page corresponding to the operation information, the processing result includes an audio and video stream obtained by encoding the target game page.

For example, the server may transmit the processing result to the terminal directly or through a gateway, which may vary in other embodiments. Before transmitting the processing result, the server needs to encapsulate the processing result into an information format supported by the transmission process.

After the server transmits the processing result to the terminal, the terminal receives the processing result transmitted by the server. The processing result is a result obtained by the server after executing a processing service corresponding to the operation information in response to the operation information being information of the non-shareable type. After receiving the processing result, the terminal displays a game page corresponding to the processing result. The processing result includes information of the game page corresponding to the processing result, and the terminal can display the game page corresponding to the processing result according to the information of the game page included in the processing result. In one implementation or embodiment, the game page corresponding to the processing result refers to the target game page corresponding to the operation information, and the information of the game page corresponding to the processing result included in the processing result refers to the audio and video stream obtained by encoding the target game page. In this example, the terminal first decodes the audio and video stream, and then displays the game page corresponding to the processing result.

In step 206, the server transmits the sharing information including the data to-be-shared to the terminal.

After generating the sharing information including the data to-be-shared, the server transmits the sharing information including the data to-be-shared to the terminal, so that the terminal executes the process of sharing the data to-be-shared to the social application. In one implementation or embodiment, the server transmits the sharing information including the data to-be-shared to the terminal in either of the following two manners:

Manner I: The server directly transmits the sharing information including the data to-be-shared to the terminal.

Manner II: The server transmits the sharing information including the data to-be-shared to a gateway, and the gateway transmits the sharing information including the data to-be-shared to the terminal.

Figure 5:
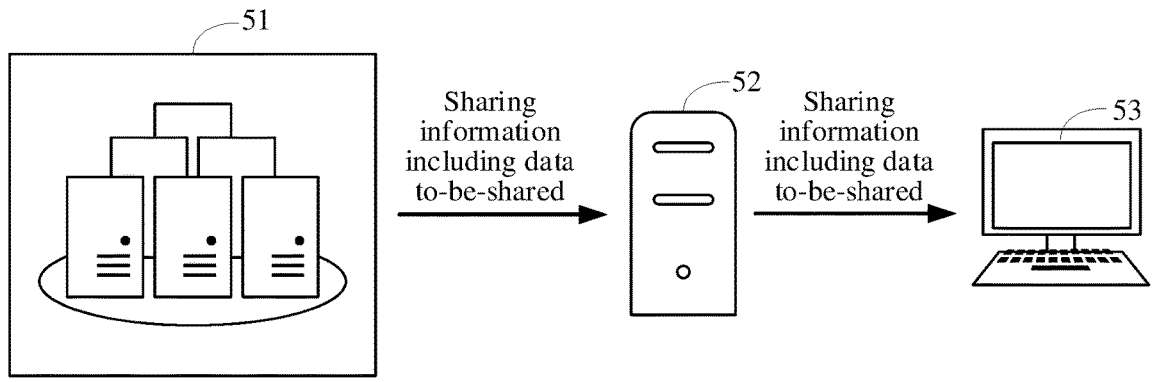
FIG. 5 is a schematic diagram of a process of transmitting sharing information including data to-be-shared by a server to a terminal according to one embodiment one embodiment.

For example, a schematic diagram of a process in which the server transmits the sharing information including the data to-be-shared to the terminal in Manner II is as shown in FIG. 5. In FIG. 5, a server 51 transmits the sharing information including the data to-be-shared to a gateway 52, and the gateway 52 transmits the sharing information including the data to-be-shared to the terminal 53.

Figure 6:
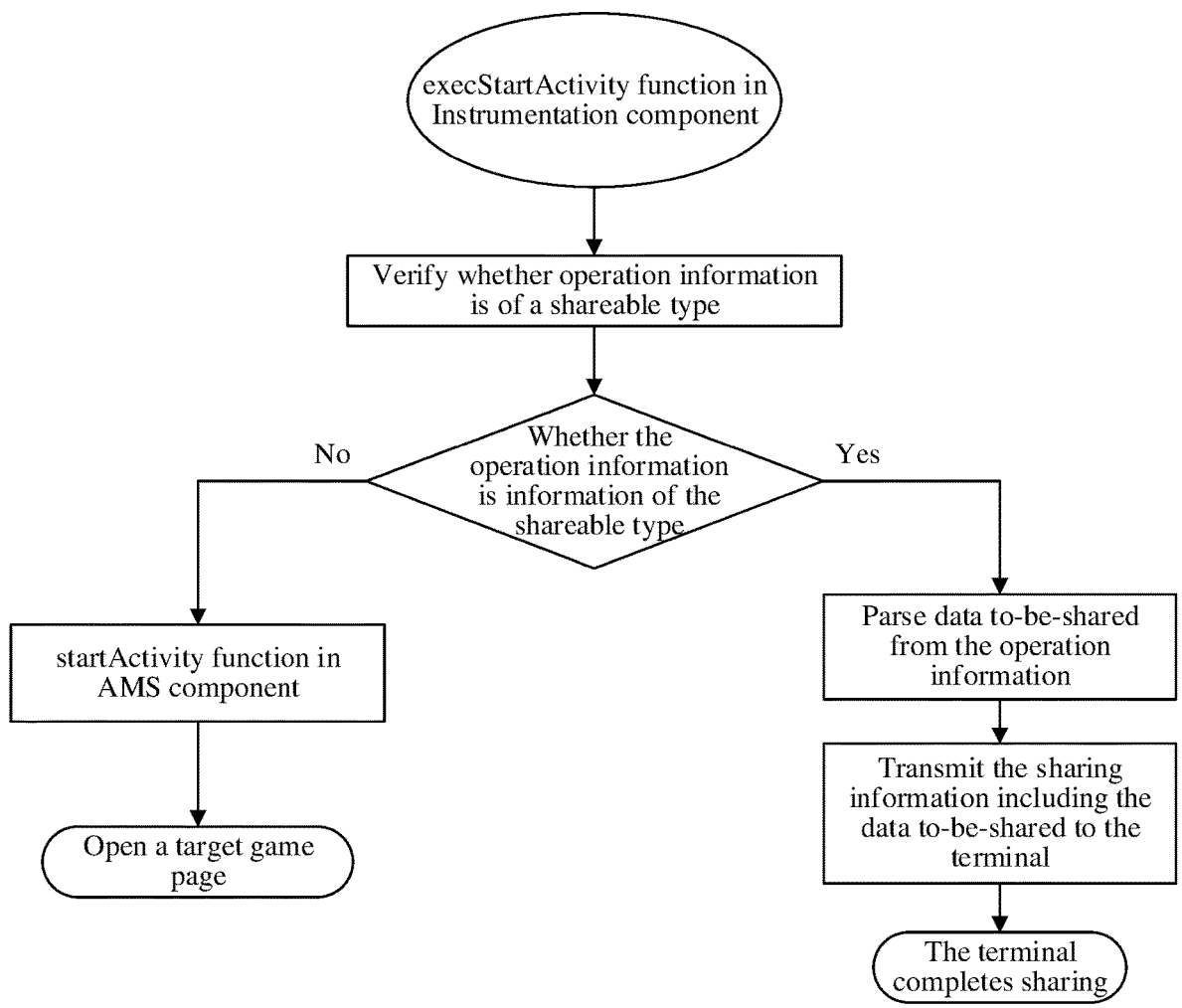
FIG. 6 is a schematic diagram of another process of processing operation information by a server according to one embodiment one embodiment.

For example, the process of processing the operation information by the server is as shown in FIG. 6. The server uses the execStartActivity function in the Instrumentation component of the operating system of the server to verify whether the operation information is of the shareable type. When the operation information is information of the shareable type, the server parses the data to-be-shared from the operation information, and transmits the sharing information including the data to-be-shared to the terminal, so that the terminal shares the data to-be-shared to the social application, thus completing the sharing. When the operation information is information of the non-shareable type, the server transmits the operation information to the AMS component of the operating system, and uses the startActivity function in the AMS component to open the target game page corresponding to the operation information.

In step 207, the terminal receives the sharing information including the data to-be-shared transmitted by the server, and shares the data to-be-shared to a target social application.

After the server transmits the sharing information including the data to-be-shared to the terminal, the terminal receives the sharing information including the data to-be-shared transmitted by the server. In one implementation or embodiment, when the server directly transmits the sharing information including the data to-be-shared to the terminal, the terminal receives the sharing information including the data to-be-shared directly transmitted by the server; when the server transmits the sharing information including the data to-be-shared to a gateway, the terminal receives, from the gateway, the sharing information including the data to-be-shared transmitted by the server.

After receiving the sharing information including the data to-be-shared, the terminal shares the data to-be-shared to the target social application. The target social application is the social application to be shared. In one implementation or embodiment, the process of sharing the data to-be-shared to the target social application by the terminal includes the following steps 1 to 3:

Step 1: The terminal generates invocation information based on the sharing information, the invocation information including the data to-be-shared.

The information format of the sharing information is an information format supported by the transmission process, and the information format of the invocation information is an information format supported by the operating system of the terminal. Because the information format of the sharing information may not be identified and processed by the components in the operating system of the terminal, it may be necessary to generate invocation information in an information format supported by the operating system of the terminal based on the sharing information.

In an example embodiment, an operating system of the terminal for accessing the cloud game is consistent with the operating system of the server, so as to ensure that functions of the cloud game can be normally implemented on the terminal and the game page can be normally displayed on the terminal. That is to say, when the operating system of the server is an Android system, the operating system of the terminal for accessing the cloud game is also an Android system. For example, when the operating system of the terminal is an Android system, the information format supported by the operating system of the terminal is the Intent information format. That is to say, the information format of the invocation information generated by the terminal is the Intent information format.

In an example embodiment, the invocation information in the Intent information format includes two parts: an invocation target and data to-be-shared. For example, the data to-be-shared in the invocation information can be directly extracted from the sharing information, that is, the data to-be-shared in the sharing information is used as the data to-be-shared in the invocation information. The invocation target in the invocation information is used for identifying a social application to be invoked and an interaction page to be redirected to in the social application. In addition to the data to-be-shared, data of the sharing information also includes information for indicating the sharing target, and the terminal can generate an invocation target conforming to the Intent information format according to the information for indicating the sharing target in the data of the sharing information. Thus, the terminal completes the process of generating the invocation information based on the sharing information.

Step 2: Start the target social application corresponding to the invocation information by using a start function in a management component of an operating system.

After the invocation information is generated, because the information format of the invocation information is an information format supported by the operating system of the terminal and the invocation information includes the invocation target, the operating system of the terminal can determine the invocation target based on the invocation information, that is, determine the target social application to be invoked.

In one implementation or embodiment, a game application for accessing the cloud game is installed in the terminal, and a service component is integrated in the game application. In some embodiments, the service component integrated in the game application of the terminal and the service component integrated in the cloud game of the server are the same service component. For example, the service component is the MSDK. Before the terminal starts the target social application corresponding to the invocation information by using the start function in the management component of the operating system of the terminal, the service component in the game application of the terminal invokes the sharing interface and transmits the invocation information to the operating system of the terminal. Then, the terminal can start the target social application corresponding to the invocation information by using the start function in the management component of the operating system of the terminal.

In an example embodiment, where the operating system of the terminal is an Android system, the management component of the operating system refers to the AMS component of the Android system, and the start function in the management component refers to the startActivity function. Because the operating system of the terminal is the same as that of the server, the management component of the operating system and the start function in the management component in the terminal are also the same as those in the server.

Because the operating system of the terminal can determine the target social application to be invoked based on the invocation information, the target social application to be invoked can be started by using the operating system of the terminal. Starting the target social application refers to opening the target social application in a current window. The process of starting the target social application is a process of jumping from the game application for accessing the cloud game jumps to the target social application. The target social application of the terminal is a social application corresponding to the player's personal account, and a friends chain in the target social application is a friends chain of the player.

Step 3: Share the data to-be-shared in the invocation information to the target social application.

After starting the target social application, the terminal shares the data to-be-shared in the invocation information to the target social application, so as to realize the sharing of the data to-be-shared in the cloud game to the local social application of the terminal.

The above steps 1 to 3 are an example description of one implementation of sharing the data to-be-shared to the target social application by the terminal, and there are other examples in other embodiments. For example, where the information format of the sharing information is an information format supported by the operating system of the terminal, the terminal can also directly share the data to-be-shared in the sharing information to the target application.

The sharing of the data to-be-shared to the target social application can be realized by either sharing the data to-be-shared in the invocation information to the target social application or directly sharing the data to-be-shared in the sharing information to the target application. In one implementation or embodiment, the process of sharing the data to-be-shared to the target social application includes the following steps a and b:

Step a: Redirect a display page of the target social application to a first interaction page.

The sharing of the data to-be-shared in the invocation information to the target application is described by way of example. Because the invocation information includes the data for indicating the target social application to be invoked and data for indicating the interaction page to be redirected to in the target social application, not only the target social application to be invoked but also the interaction page to be redirected to in the target social application can be determined according to the invocation information. The interaction page to be redirected to in the target application is used as a first interaction page.

After determining the first interaction page, the terminal redirects a display page of the target social application to the first interaction page. That is to say, after the target social application is started, the first interaction page of the target social application is displayed. The first interaction page of the target social application may include a friend selection page or an interactive information publishing page, which is related to the type of the share control triggered when the player generates the share instruction. The type is just one example and in other embodiments may vary. For example, when the type of the share control triggered when the player generates the share instruction is sharing to a friend in the first social application or sharing to a friend in the second social application, the first interaction page of the target social application is a friend selection page. When the type of the share control triggered when the player generates the share instruction is sharing to an interactive community in the first social application or sharing to an interactive community in the second social application, the first interaction page of the target social application is an interactive information publishing page.

The friend selection page is used for the player to select a friend to share with. The friend selection page can display information of friends available for selection in the target social application. The friends available for selection include friends who have chatted with the player recently, or include all friends who have a friend relationship with the player. The friends available may vary in other embodiments. For example, the displayed information of the friend includes at least one of avatar information or nickname information of the friend.

The interactive information publishing page is used for players to complete and confirm interaction information to be published to the interactive community. The interactive information publishing page not only displays the data to-be-shared to be published, but also displays an input box for the player to fill in an introduction of the data to-be-shared.

Step b: Share the data to-be-shared to a second interaction page of the target social application based on a confirmation instruction in the first interaction page, the second interaction page being an interaction page matching confirmation information carried in the confirmation instruction.

After the first interaction page is displayed, the player can trigger a confirmation operation on the first interaction page, and then the terminal obtains a confirmation instruction in the first interaction page. In one implementation or embodiment, when the first interaction page is a friend selection page, the player can select a friend to share with on the friend selection page, and then trigger a confirmation operation, and the terminal obtains a confirmation instruction in the first interaction page. When the first interaction page is an interactive information publishing page, the player can fill in the introduction of the data to-be-shared and then trigger a confirmation operation, or directly trigger a confirmation operation without filling in the introduction of the data to-be-shared. After the confirmation operation is triggered, the terminal obtains a confirmation instruction in the first interaction page. The confirmation command carries confirmation information.

After obtaining the confirmation instruction in the first interaction page, the terminal determines a second interaction page matching the confirmation information carried in the confirmation instruction, and then shares the data to-be-shared to the second interaction page of the target social application. For example, when the first interaction page is a friend selection page, the confirmation information carried in the confirmation instruction refers to information of a friend to share with, the second interaction page matching the information of the friend to share with refers to a conversation page of the friend to share with, and sharing the data to-be-shared to the second interaction page refers to transmitting the data to-be-shared to the conversation page of the friend to share with. When the first interaction page is an interactive information publishing page, the confirmation information carried in the confirmation instruction refers to interaction information to be published including the data to-be-shared, the second interaction page matching the interaction information to be published including the data to-be-shared refers to an interactive community display page, and sharing the data to-be-shared to the second interaction page refers to publishing the interaction information to be published including the data to-be-shared to the interactive community display page.

After the terminal shares the data to-be-shared to the second interaction page of the target social application, one or more of the following display steps is performed:

Manner I: Display the second interaction page.

In Manner I, after the data to-be-shared is shared to the second interaction page, the terminal directly displays the second interaction page, and the data to-be-shared is displayed on the second interaction page. For example, when the second interaction page is a conversation page of a certain friend, the conversation page of the friend is directly displayed, where the conversation page displays the data to-be-shared that the friend is expected to view. When the second interaction page is an interactive community display page, the interactive community display page is directly displayed, where the published interaction information carrying the data to-be-shared is displayed on the interactive community display page.

Manner II: Return to a game page.

In Manner II, after sharing the data to-be-shared to the second interaction page, the terminal directly returns to a game page. For example, the game page is a game page that generates the operation instruction during the cloud game. After returning to the game page, the player can continue to play the cloud game on the game page.

Manner III: Display a selection box, the selection box including a first option and a second option. These manners are just examples and in other embodiments may vary.

The first option is used for instructing to return to a game page corresponding to the first option, and the second option is used for instructing to stay in the target social application. In Manner III, after the data to-be-shared is shared to the second interaction page, the terminal displays a selection box for selection by the player, which can improve the user interaction.

After the selection box is displayed, the player can trigger the first option or the second option. The terminal returns to the game page corresponding to the first option in response to a trigger instruction on the first option; and displays a target interaction page of the target social application in response to a trigger instruction on the second option. The game page corresponding to the first option is set according to experience, or flexibly adjusted according to the application scenario, which may vary in other embodiments. For example, the game page corresponding to the first option refers to the game page that generates the operation instruction during the cloud game. The target interaction page is set according to experience or flexibly adjusted according to application scenarios, which may vary in other embodiments. For example, the target interaction page refers to the second interaction page, or the target interaction page refers to a home screen of the target social application. After displaying the target interaction page of the target social application, the terminal can further display other interaction pages of the target social application based on the player's trigger operation.

Figure 7:
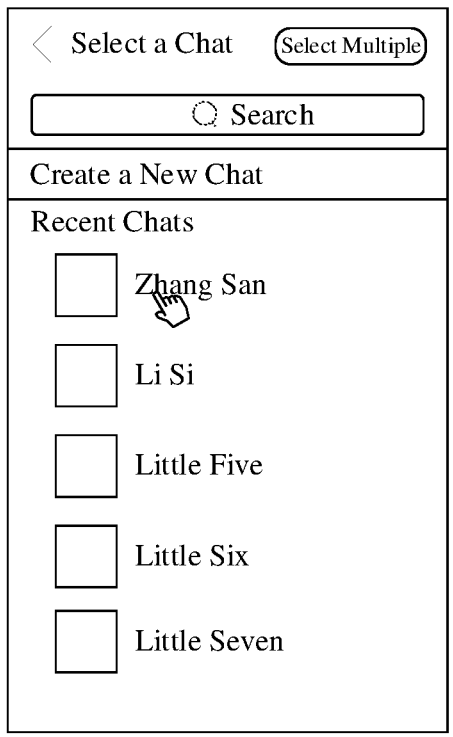
FIG. 7 is a schematic diagram of a process of sharing data to-be-shared by a terminal to a target social application according to one embodiment one embodiment.
Figure 7:
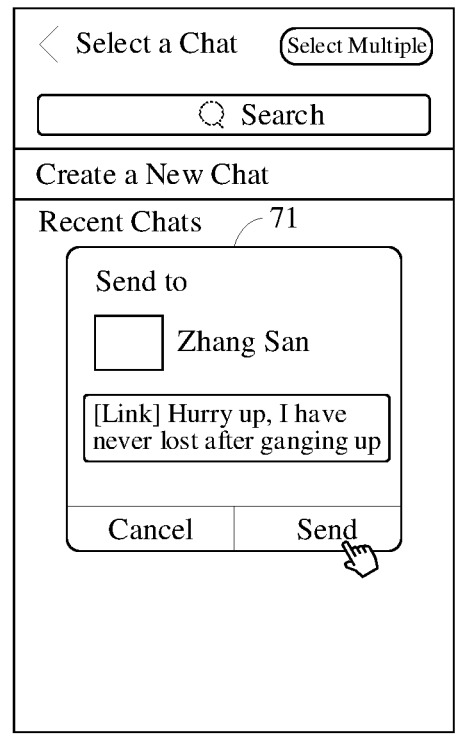
Figure 7:
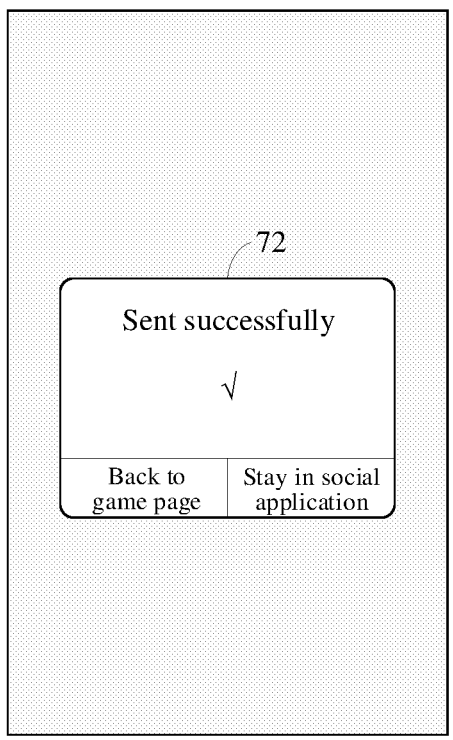
Figure 7:
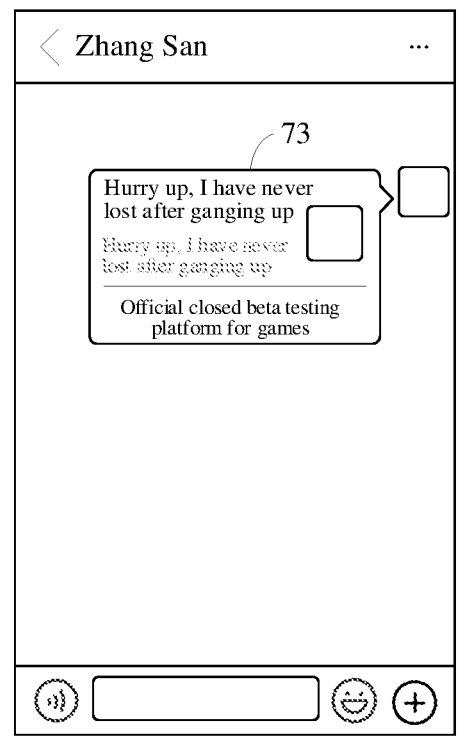

For example, a schematic diagram of a process of sharing the data to-be-shared to the target social application by the terminal is shown in FIG. 7. When the first interaction page is a friend selection page, the first interaction page is shown in section (1) in FIG. 7. When the player selects a friend "Zhang San" on the page shown in section (1) in FIG. 7, a confirmation box 71 shown in section (2) in FIG. 7 pops up on the first interaction page. When the player triggers a share button in the confirmation box 71, the terminal obtains a confirmation instruction in the first interaction page, and then the terminal shares the data to-be-shared to a conversation page of the friend "Zhang San". After the sharing, a selection box 72 shown in section (3) in FIG. 7 pops up on the first interaction page. In the selection box 72, the first option is an option of "Back to game page", and the second option is an option of "Stay in social application". After the sharing, a conversation page of the friend "Zhang San" shown in section (4) in FIG. 7 may also be directly displayed, where data to-be-shared 73 is displayed on the conversation page.

Once the terminal shares the data to-be-shared to the second interaction page of the target social application, the process of sharing the data to-be-shared in the cloud game to the social application of the terminal is complete.

Figure 8:
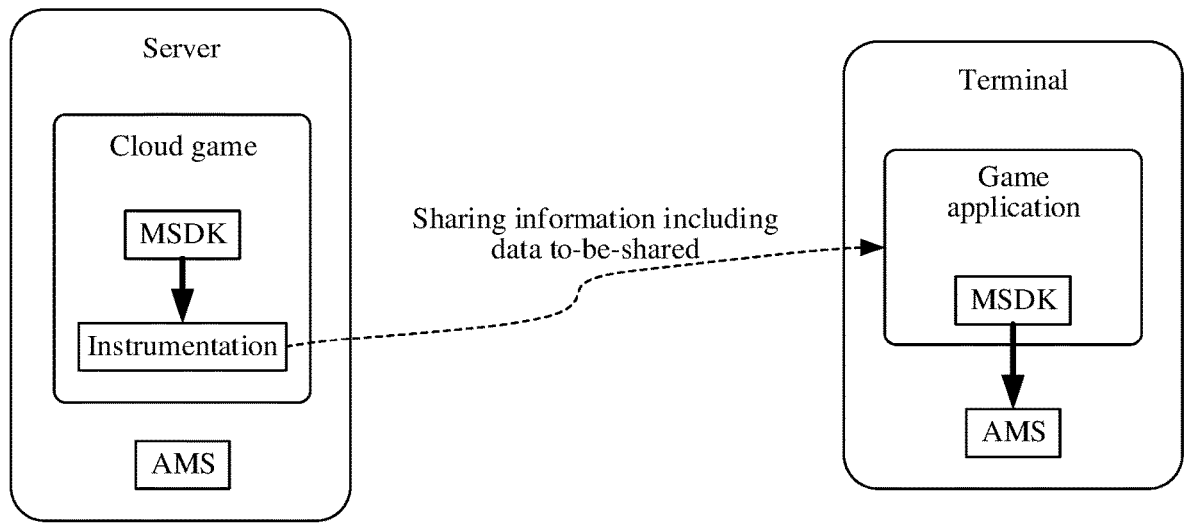
FIG. 8 is a schematic diagram of an information processing process according to one embodiment one embodiment.

For example, an information processing process is as shown in FIG. 8. The server transmits operation information to the operating system of the server through the MSDK integrated in the cloud game. The execStartActivity function in the Instrumentation component of the operating system of the server verifies whether the operation information is of the shareable type. When the operation information is information of the shareable type, the server transmits the sharing information including the data to-be-shared to the terminal. After receiving the sharing information, the terminal generates invocation information. The MSDK integrated in the game application of the terminal transmits the invocation information to the operating system of the terminal. The startActivity function in the AMS component of the operating system of the terminal starts the target social application. Then, the data to-be-shared is shared to the target social application.

In the related art, to support login to a cloud game using an account of a social application, the social application is also installed in the server in addition to the cloud game. The social application installed on the server is only used for login to the cloud game using a social application account, not the player's account registered with the cloud game. In addition, the player can only operate the social application installed on his/her own terminal, and cannot operate the social application on the server. In existing technical solutions for cloud games, the function of sharing to a social application is directly disabled because it cannot be realized technically; or only sharing to a social application on a server is supported, but sharing to a social application on the player's terminal is not supported. In this embodiment of this application, the server transmits the sharing information including the data to-be-shared to the terminal, so as to realize the sharing of the data to-be-shared in the cloud game to the local social application of the terminal, thereby providing the same user experience as that of sharing from a local game on a terminal to a local social application on the terminal.

In this embodiment of this application, when the operation information is information of the shareable type, the server parses the data to-be-shared from the operation information, and transmits the sharing information including the data to-be-shared to the terminal, so that the terminal shares the data to-be-shared to the social application In this information processing process, a step of determining whether the operation information is information of a shareable type is additionally executed by the server, and the server transmits the data to-be-shared parsed from the operation information of the shareable type to the terminal, so that the terminal shares the data to-be-shared to the social application on the terminal. By this process, data to-be-shared in a cloud game can be shared to a social application locally running on a terminal, which improves the scalability of cloud games, provides a good information processing effect, improves the sociality of cloud games, achieves a high degree of dissemination of cloud games, improves the degree of participation of players in cloud games, and improves the interaction rate of cloud games.

One embodiment provides an information processing system, including a terminal and a server,
the terminal being configured to log in to a cloud game installed in the server based on a trigger instruction of a cloud game login portal, and obtaining an operation instruction during the cloud game; and transmit the operation instruction to the server on which the cloud game is installed;
the server being configured to receive an operation instruction during a cloud game from the terminal; generate operation information based on the operation instruction; parse data to-be-shared from the operation information in response to the operation information being information of a shareable type, and generate sharing information including the data to-be-shared; and transmit the sharing information including the data to-be-shared to the terminal; and
the terminal being further configured to receive the sharing information including the data to-be-shared transmitted by the server, and sharing the data to-be-shared to a target social application.

In this embodiment of this application, when the operation information is information of the shareable type, the server parses the data to-be-shared from the operation information, and transmits the sharing information including the data to-be-shared to the terminal, so that the terminal shares the data to-be-shared to the social application In this information processing process, a step of determining whether the operation information is information of a shareable type is additionally executed by the server, and the server transmits the data to-be-shared parsed from the operation information of the shareable type to the terminal, so that the terminal shares the data to-be-shared to the social application on the terminal. By this process, data to-be-shared in a cloud game can be shared to a social application locally running on a terminal, which improves the scalability of cloud games, provides a good information processing effect, improves the sociality of cloud games, achieves a high degree of dissemination of cloud games, improves the degree of participation of players in cloud games, and improves the interaction rate of cloud games.

Figure 9:
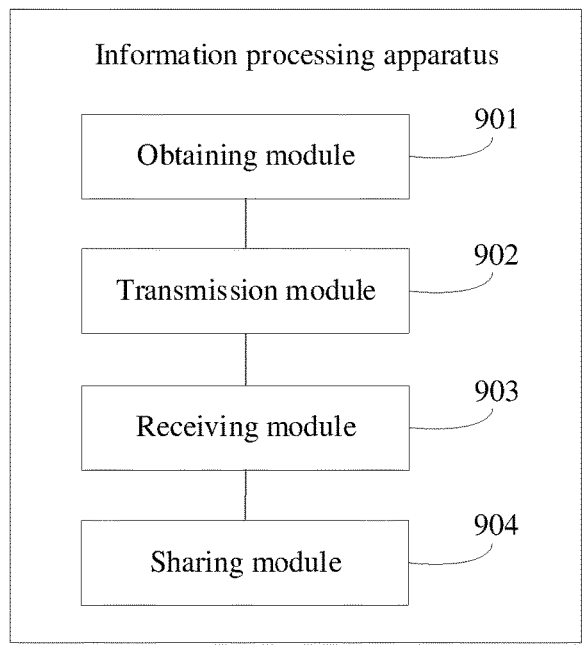
FIG. 9 is a schematic diagram of an information processing apparatus according to one embodiment one embodiment.

Referring to FIG. 9, one embodiment provides an information processing apparatus, which is applicable to a terminal, and implements the functions executed by the terminal in the information processing method described in FIG. 2 through the following modules shown in FIG. 9. The apparatus includes:
an obtaining module 901, configured to log in to a cloud game installed in a server based on a trigger instruction of a cloud game login portal, and obtaining an operation instruction during the cloud game;
a transmission module 902, configured to transmit the operation instruction to the server on which the cloud game is installed, so that the server generates operation information based on the operation instruction; and parse data to-be-shared from the operation information in response to the operation information being information of a shareable type, generate sharing information including the data to-be-shared, and transmit the sharing information including the data to-be-shared to a terminal;
a receiving module 903, configured to receive the sharing information including the data to-be-shared transmitted by the server; and
a sharing module 904, configured to share the data to-be-shared to a target social application.

In one implementation or embodiment, the sharing module 904 is further configured to redirect a display page of the target social application to a first interaction page; and share the data to-be-shared to a second interaction page of the target social application based on a confirmation instruction in the first interaction page, the second interaction page being an interaction page matching confirmation information carried in the confirmation instruction.

Figure 10:
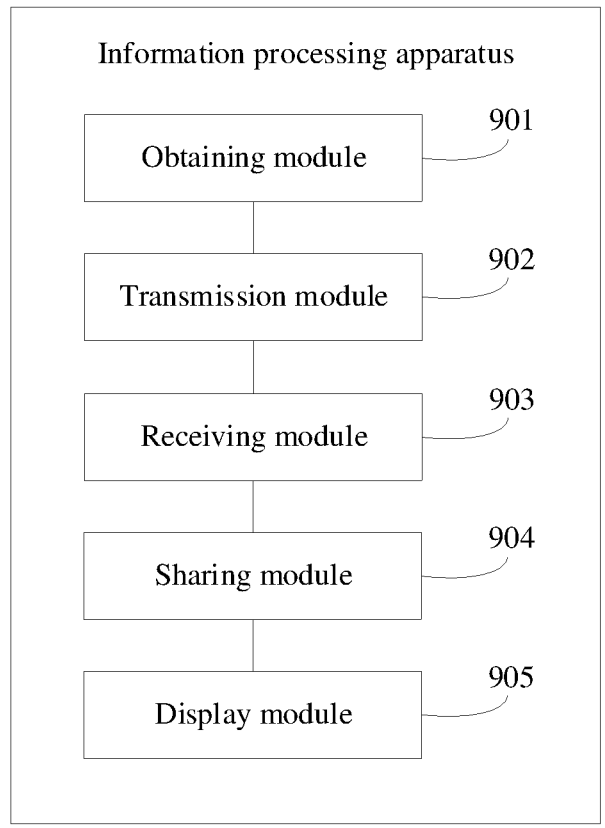
FIG. 10 is a schematic diagram of another information processing apparatus according to one embodiment one embodiment.

In one implementation or embodiment, referring to FIG. 10, the apparatus further includes:
a display module 905, configured to display a selection box, the selection box including a first option and a second option; return to a game page corresponding to the first option in response to a trigger instruction on the first option; and display a target interaction page of the target social application in response to a trigger instruction on the second option.

In one implementation or embodiment, the sharing module 904 is further configured to generate invocation information based on the sharing information, the invocation information including the data to-be-shared; start the target social application corresponding to the invocation information by using a start function in a management component of an operating system; and share the data to-be-shared in the invocation information to the target social application.

In one implementation or embodiment, the receiving module 903 is further configured to receive a processing result transmitted by the server, the processing result being a result obtained by the server after executing a processing service corresponding to the operation information in response to the operation information being information of a non-shareable type; and the display module 905 is further configured to display a game page corresponding to the processing result.

In one implementation or embodiment, the obtaining module 901 is further configured to display a cloud game login page based on the trigger instruction of the cloud game login portal; obtain login information on the cloud game login page, and transmit the login information to the server for verification; and log in to the cloud game installed in the server in response to the server returning a response indicating that the verification is passed.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

In this embodiment of this application, when the operation information is information of the shareable type, the server parses the data to-be-shared from the operation information, and transmits the sharing information including the data to-be-shared to the terminal, so that the terminal shares the data to-be-shared to the social application In this information processing process, a step of determining whether the operation information is information of a shareable type is additionally executed by the server, and the server transmits the data to-be-shared parsed from the operation information of the shareable type to the terminal, so that the terminal shares the data to-be-shared to the social application on the terminal. By this process, data to-be-shared in a cloud game can be shared to a social application locally running on a terminal, which improves the scalability of cloud games, provides a good information processing effect, improves the sociality of cloud games, achieves a high degree of dissemination of cloud games, improves the degree of participation of players in cloud games, and improves the interaction rate of cloud games.

Figure 11:
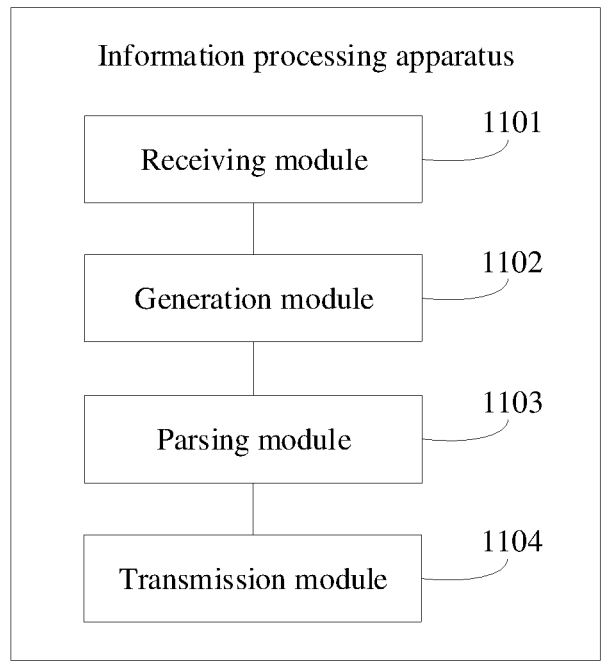
FIG. 11 is a schematic diagram of another information processing apparatus according to one embodiment one embodiment.

Referring to FIG. 11, one embodiment provides an information processing apparatus, which is applicable to a server, and implements the functions executed by the server in the information processing method described in FIG. 2 through the following modules shown in FIG. 11. The apparatus includes:

a receiving module 1101, configured to receive an operation instruction during a cloud game from a terminal;

a generation module 1102, configured to generate operation information based on the operation instruction;

a parsing module 1103, configured to parse data to-be-shared from the operation information in response to the operation information being information of a shareable type;

the generation module 1102 being further configured to generate sharing information including the data to-be-shared; and a transmission module 1104, configured to transmit the sharing information including the data to-be-shared to the terminal, so that the terminal shares the data to-be-shared to a target social application.

Figure 12:
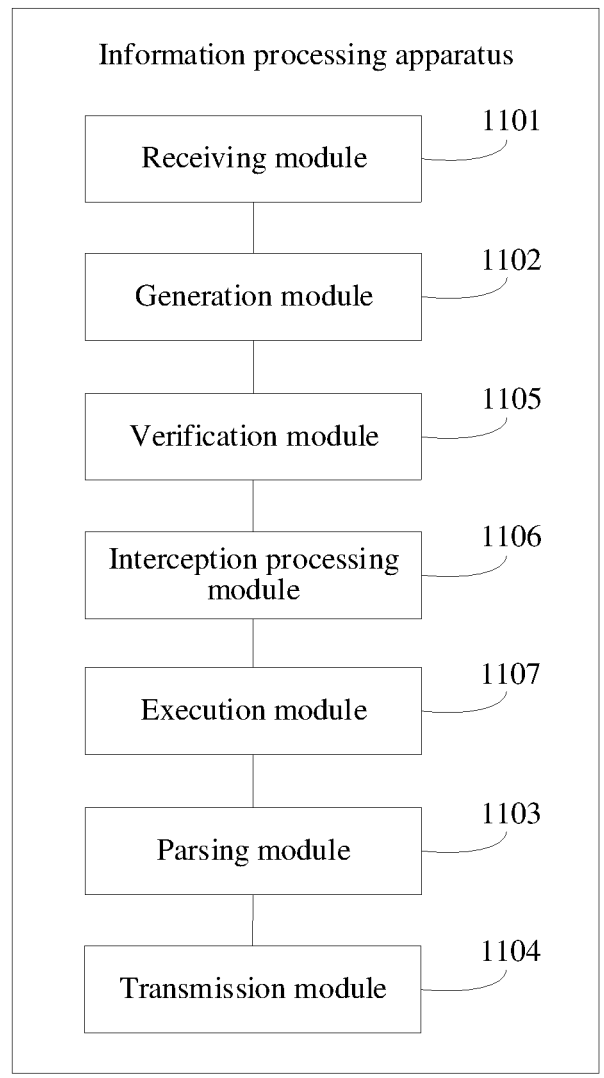
FIG. 12 is a schematic diagram of another information processing apparatus according to one embodiment one embodiment.

In one implementation or embodiment, referring to FIG. 12, the apparatus further includes:

a verification module 1105, configured to verify whether the operation information is of the shareable type by using an operating system; and determine that the operation information is information of the shareable type in response to the verification being passed.

In one implementation or embodiment, the cloud game integrates a service component and an interception component, and referring to FIG. 12, the apparatus further includes:

an interception processing module 1106, configured to perform interception processing on a sharing interface in the service component by using the interception component; and determine that the operation information is information of the shareable type in response to intercepting the operation information at the sharing interface.

In one implementation or embodiment, the verification module 1105 is further configured to initiate a processing request for the operation information by using a first function in a first component of the operating system, the processing request carrying the operation information; and verify whether the operation information carried in the processing request is of the shareable type by using a second function in a second component of the operating system.

In one implementation or embodiment, referring to FIG. 12, the apparatus further includes:

an execution module 1107, configured to execute a processing service corresponding to the operation information in response to the operation information being information of a non-shareable type, to obtain a processing result; and the transmission module 1104 is further configured to transmit the processing result to the terminal.

In this embodiment of this application, when the operation information is information of the shareable type, the server parses the data to-be-shared from the operation information, and transmits the sharing information including the data to-be-shared to the terminal, so that the terminal shares the data to-be-shared to the social application In this information processing process, a step of determining whether the operation information is information of a shareable type is additionally executed by the server, and the server transmits the data to-be-shared parsed from the operation information of the shareable type to the terminal, so that the terminal shares the data to-be-shared to the social application on the terminal. By this process, data to-be-shared in a cloud game can be shared to a social application locally running on a terminal, which improves the scalability of cloud games, provides a good information processing effect, improves the sociality of cloud games, achieves a high degree of dissemination of cloud games, improves the degree of participation of players in cloud games, and improves the interaction rate of cloud games.

When the apparatus provided in the foregoing embodiments implements functions of the apparatus, the division of the foregoing functional modules is merely an example for description. In practical applications, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same conception. For some embodiments, reference may be made to the other embodiments and certain components, elements, and steps are not repeated.

Figure 13:
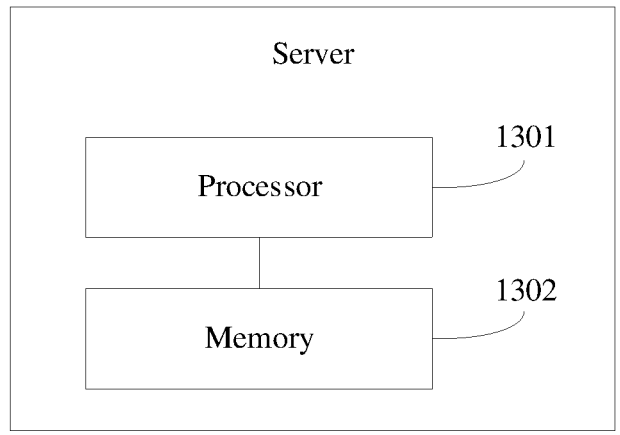
FIG. 13 is a schematic structural diagram of a server according to one embodiment one embodiment.

FIG. 13 is a schematic structural diagram of a server according to one embodiment. The server may vary due to different configurations or performance. For example, the server includes one or more processors (CPUs) 1301 and one or more memories 1302. The one or more memories 1302 store at least one program code, the at least one program code being loaded and executed by the one or more processors 1301 to implement the information processing methods according to the foregoing method embodiments. Certainly, the server may also have components such as a wired or wireless network interface, a keyboard, and an input/output interface for ease of input/output, and may further include other components for implementing functions of the device, which will not be described in detail herein.

Figure 14:
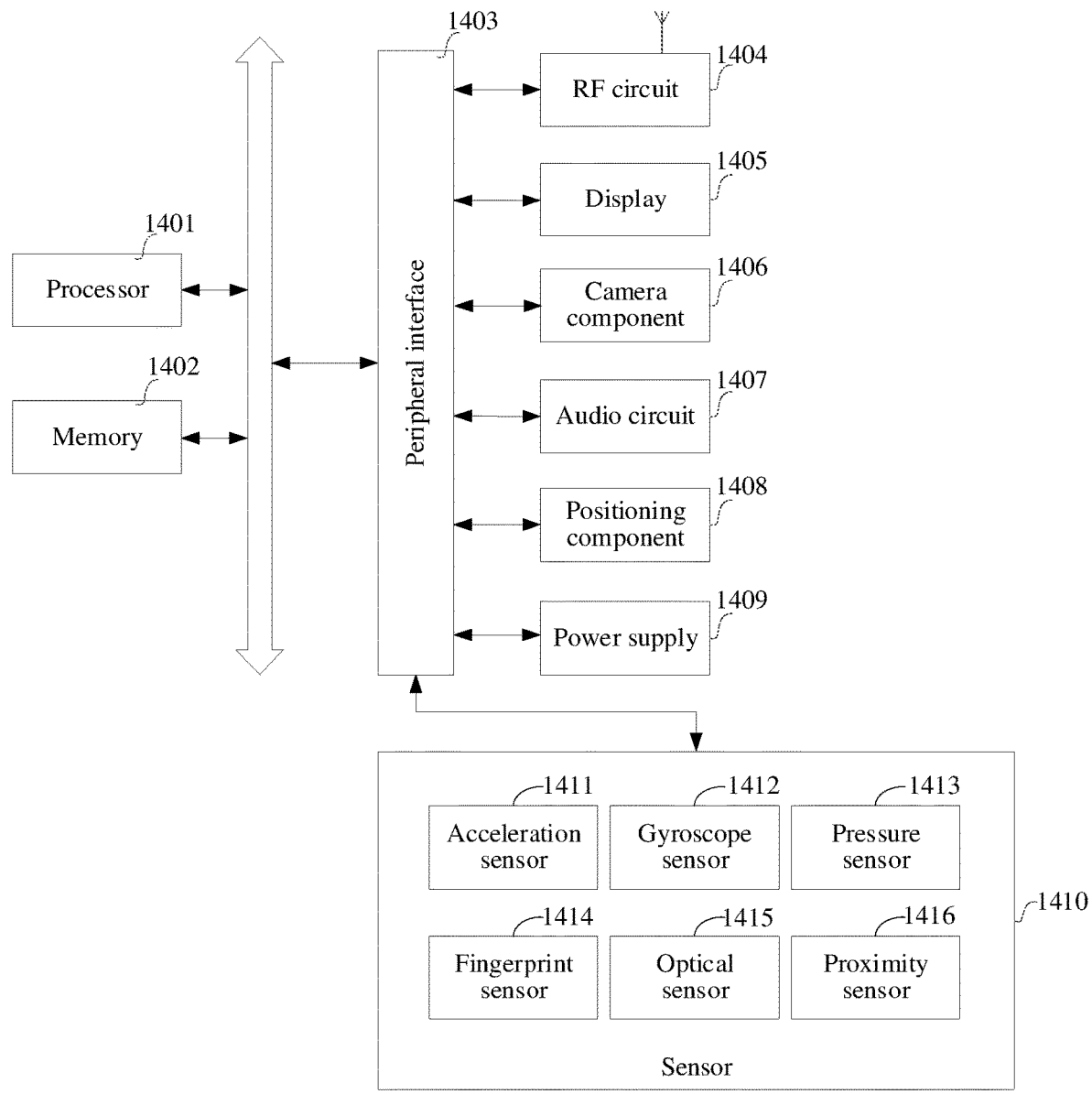
FIG. 14 is a schematic structural diagram of a terminal according to one embodiment one embodiment.

FIG. 14 is a schematic structural diagram of a terminal according to one embodiment. For example, the terminal is a smartphone, a tablet computer, a notebook computer, or a desktop computer. The terminal may also be referred to as a user equipment, a portable terminal, a laptop terminal, a desktop terminal, or other names.

For example, the terminal includes a processor 1401 and a memory 1402.

The processor 1401 may include one or more processing cores, for example, a 4-core processor or an 8-core processor. The processor 1401 may be implemented in at least one hardware form of a digital signal processor (DSP), a field-programmable gate array (FPGA), or a programmable logic array (PLA). The processor 1401 may also include a main processor and a coprocessor. The main processor is configured to process data in an awake state, and is also referred to as a central processing unit (CPU). The coprocessor is a low-power processor configured to process data in a standby state. In some embodiments, the processor 1401 may be integrated with a graphics processing unit (GPU). The GPU is configured to render and draw content that needs to be displayed on a display. In some embodiments, the processor 1401 further includes an artificial intelligence (AI) processor. The AI processor is configured to process a computing operation related to machine learning.

The memory 1402 may include one or more non-transitory computer-readable storage media. For example, the non-transitory computer-readable storage media may be non-transitory. The memory 1402 may further include a high-speed random access memory and a non-volatile memory, such as one or more magnetic disk storage devices or flash storage devices. In some embodiments, the non-transitory computer-readable storage medium in the memory 1402 is configured to store at least one instruction, the at least one instruction being configured to be executed by the processor 1401 to perform the information processing method provided in the method embodiments of this application.

In some embodiments, the terminal may include a peripheral interface 1403 and at least one peripheral. The processor 1401, the memory 1402, and the peripheral interface 1403 may be connected by a bus or a signal cable. Each peripheral may be connected to the peripheral interface 1403 by a bus, a signal cable, or a circuit board. In one example, the peripheral device includes: at least one of a radio frequency (RF) circuit 1404, a touch display 1405, a camera component 1406, an audio circuit 1407, a positioning component 1408, or a power supply 1409.

The peripheral interface 1403 is configured to connect the at least one peripheral related to input/output (I/O) to the processor 1401 and the memory 1402. In some embodiments, the processor 1401, the memory 1402, and the peripheral interface 1403 are integrated on the same chip or the same circuit board. In some other embodiments, any one or two of the processor 1401, the memory 1402, and the peripheral interface 1403 may be implemented on an independent chip or circuit board, which are just examples and in other embodiments may be implemented in other ways.

The RF circuit 1404 is configured to receive and transmit RF signals, also referred to as electromagnetic signals. The RF circuit 1404 communicates with a communication network and other communication devices by using the electromagnetic signals. The RF circuit 1404 converts an electrical signal into an electromagnetic signal for transmission, or converts a received electromagnetic signal into an electrical signal. In some embodiments, the RF circuit 1404 includes: an antenna system, an RF transceiver, one or more amplifiers, a tuner, an oscillator, a digital signal processor, a codec chip set, a subscriber identity module card, and the like. The RF circuit 1404 may communicate with another terminal through at least one wireless communication protocol. The wireless communication protocol includes: a metropolitan area network, generations of mobile communication networks (2G, 3G, 4G, and 5G), a wireless local area network, and/or a wireless fidelity (Wi-Fi) network. In some embodiments, the RF circuit 1404 may further include a circuit related to near field communication (NFC), which are just examples and in other embodiments may vary.

The display 1405 is configured to display a user interface (UI). For example, the UI may include a graph, a text, an icon, a video, and any combination thereof. When the display 1405 is a touch display, the display 1405 further has a capability of acquiring a touch signal on or above a surface of the display 1405. The touch signal may be inputted to the processor 1401 as a control signal for processing. In this example, the display 1405 may be further configured to provide a virtual button and/or a virtual keyboard that are/is also referred to as a soft button and/or a soft keyboard. In some embodiments, there is one display 1405, disposed on a front panel of the terminal. In some other embodiments, there are at least two displays 1405, disposed on different surfaces of the terminal respectively or in a folded design. In still some other embodiments, the display 1405 may be a flexible display, disposed on a curved surface or a folded surface of the terminal. Even, the display 1405 may be further configured to have a non-rectangular irregular pattern, that is, a special-shaped screen. The display screen 1405 may be prepared by using materials such as a liquid crystal display (LCD), an organic light-emitting diode (OLED), or the like.

The camera component 1406 is configured to acquire images or videos. In some embodiments, the camera component 1406 includes a front-facing camera and a rear-facing camera. For example, the front-facing camera is disposed on a front panel of the terminal, and the rear-facing camera is disposed on a rear surface of the terminal. In some embodiments, there are at least two rear-facing cameras, which are each any one of a main camera, a depth-of-field camera, a wide-angle camera, or a telephoto camera, to achieve a background blurring function through fusion of the main camera and the depth-of-field camera, panoramic photographing and virtual reality (VR) photographing through fusion of the main camera and the wide-angle camera, or other fusion photographing functions. In some embodiments, the camera component 1406 further includes a flash. The flash is a single color temperature flash or a double color temperature flash. The double color temperature flash is a combination of a warm light flash and a cold light flash, and may be used for light compensation under different color temperatures.

The audio circuit 1407 includes a microphone and a speaker. The microphone is configured to acquire sound waves of a user and an environment, and convert the sound waves into an electrical signal to input to the processor 1401 for processing, or input to the RF circuit 1404 for implementing voice communication. For the purpose of stereo acquisition or noise reduction, there may be a plurality of microphones, disposed at different parts of the terminal respectively. The microphone may also be an array microphone or an omni-directional acquisition microphone. The speaker is configured to convert an electrical signal from the processor 1401 or the RF circuit 1404 into a sound wave. The speaker is a conventional thin-film speaker or a piezoelectric ceramic speaker. When the speaker is the piezoelectric ceramic speaker, the speaker can not only convert an electrical signal into a sound wave audible to a human being, but also convert an electrical signal into a sound wave inaudible to the human being for ranging and other purposes. In some embodiments, the audio circuit 1407 further includes an earphone jack.

The positioning assembly 1408 is configured to position a current geographic location of the terminal, to implement navigation or a location based service (LBS). For example, the positioning component 1408 may be a positioning component based on the Global Positioning System (GPS) of the United States, the BeiDou System of China, the GLONASS System of Russia, or the GALILEO System of the European Union.

The power supply 1409 is configured to supply power to the components in the terminal. For example, the power supply 1409 is an alternating current, a direct current, a disposable battery, or a rechargeable battery. When the power supply 1409 includes a rechargeable battery, the rechargeable battery may support wired charging or wireless charging. The rechargeable battery may further be configured to support a quick charge technology.

In some embodiments, the terminal further includes one or more sensors 1410. The one or more sensors 1410 include: an acceleration sensor 1411, a gyroscope sensor 1412, a pressure sensor 1413, a fingerprint sensor 1414, an optical sensor 1415, and a proximity sensor 1416, which are just examples and in other embodiments may vary.

The acceleration sensor 1411 can detect the magnitude of acceleration on three coordinate axes of a coordinate system established by the terminal. The gyroscope sensor 1412 can detect the body direction and rotation angle of the terminal. The pressure sensor 1413 may be disposed on a side frame of the terminal and/or a lower layer of the touch display 1405. The fingerprint sensor 1414 is configured to acquire a fingerprint image of a user. The optical sensor 1415 is configured to acquire ambient light intensity. The proximity sensor 1416 is also referred to as a distance sensor. For example, the proximity sensor 1416 is disposed at the front panel of the terminal. The proximity sensor 1416 is configured to acquire a distance between the user and a front face of the terminal.

A person skilled in the art can understand that the structure shown in FIG. 14 is merely one example and the structure of the terminal may vary in other embodiments. For example, the terminal may include more or fewer components than those shown in the figure, or some components may be combined, or a different component arrangement may be used.

In an example embodiment, a computer device is further provided, including a processor and a memory, the memory storing at least one program code. The at least one program code is loaded and executed by one or more processors to implement any one of the above information processing methods.

In an example embodiment, a non-transitory computer-readable storage medium is further provided, storing at least one program code, the at least program code being loaded and executed by a processor of a computer device to implement any one of the above information processing methods.

In some embodiments, the non-transitory computer-readable storage medium may be a read-only memory (ROM), a random access memory (RAM), a compact disc ROM (CD-ROM), a magnetic tape, a floppy disk, an optical data storage device, or the like.

In an example embodiment, a computer program product is further provided, storing at least one computer program, the at least computer program being loaded and executed by a processor of a computer device to implement any one of the above information processing methods.

It is to be understood that "plurality of" mentioned in the specification means two or more. The term "and/or" describes an association relationship for describing associated objects and represents that three relationships may exist. For example, A and/or B may represent the following three examples: Only A exists, both A and B exist, and only B exists. The character "/" generally indicates an "or" relationship between the associated objects.

In this specification, the claims, and the accompanying drawings of this application, the terms "first", "second", and so on are intended to distinguish similar objects but do not necessarily indicate a specific order or sequence. It is to be understood that, data used in this way can be interchanged in an appropriate example, so that the embodiments of this application that are described herein can be implemented in a sequence other than those sequences illustrated or described herein. The implementations described in the following example embodiments do not represent all implementations that are consistent with this application. On the contrary, the implementations are merely examples of apparatuses and methods that are described in detail in the appended claims and that are consistent with some aspects and embodiments of this application.

The foregoing descriptions are merely example embodiments of this application, but are not intended to limit this application. Any modification, equivalent replacement, or improvement made within the spirit and principle of this application shall fall within the protection scope of this application.

What is claimed is:

1. An information processing method performed by a terminal, the method comprising:

logging in, via the terminal, to a cloud game installed in a server based on a trigger instruction of a cloud game login portal;

obtaining, by the terminal, an operation instruction during the cloud game, wherein the operation instruction triggers the server on which the cloud game is installed to generate a sharing information request, wherein the server is configured to:

generate operation information based on the operation instruction; and verify whether the operation information is of a shareable type by using an operating system; and wherein the verify further comprises:

initiating a processing request for the operation information by using a first function in a first component of the operating system, the processing request carrying the operation information;

verifying whether the operation information carried in the processing request is of the shareable type by using a second function in a second component of the operating system; and determining that the operation information is information of the shareable type in response to the verification being passed;

receiving, by the terminal, the sharing information request comprising data to-be-shared transmitted by the server; and sharing, by the terminal, the data to-be-shared on a target social application in response to the sharing information request.

2. The information processing method according to claim 1 further comprises:

transmitting the operation instruction to the server, so that the server generates operation information based on the operation instruction, parses data to-be-shared from the operation information in response to the operation information being information of a shareable type, and generates sharing information request comprising the data to-be-shared.

3. The information processing method according to claim 1, wherein the sharing to the target social application further comprises:

redirecting a display page of the target social application to a first interaction page; and sharing the data to-be-shared to a second interaction page of the target social application based on a confirmation instruction in the first interaction page, the second interaction page being an interaction page matching confirmation information carried in the confirmation instruction.

4. The information processing method according to claim 3, wherein after the sharing to the second interaction page, the method further comprises:

displaying a selection box comprising a first option and a second option;

returning to a game page corresponding to the first option in response to a trigger instruction on the first option; and displaying a target interaction page of the target social application in response to a trigger instruction on the second option.

5. The information processing method according to claim 1, wherein the sharing to the target social application further comprises:

generating invocation information based on the sharing information request that includes the data to-be-shared;

starting the target social application corresponding to the invocation information by using a start function in a management component of an operating system; and sharing the data to-be-shared in the invocation information to the target social application.

6. The information processing method according to claim 1, wherein the method further comprises:

receiving a processing result transmitted by the server that is obtained by the server after executing a processing service corresponding to the operation information in response to the operation information being information of a non-shareable type; and displaying a game page corresponding to the processing result.

7. The information processing method according to claim 1, wherein the logging further comprises:

displaying a cloud game login page based on the trigger instruction of the cloud game login portal;

obtaining login information on the cloud game login page;

transmitting the login information to the server for verification; and logging in to the cloud game installed in the server in response to the server returning a response indicating that the verification passed.

8. A non-transitory computer-readable storage medium, storing at least one program code, the at least one program code being loaded and executed by a processor to implement the information processing method according to claim 1.

9. An information processing method performed by a server, the method comprising:

receiving an operation instruction during a cloud game from a terminal;

generating operation information based on the operation instruction;

verifying whether the operation information is of a shareable type by using an operating system, wherein the verifying further comprises:

initiating a processing request for the operation information by using a first function in a first component of the operating system, the processing request carrying the operation information;

verifying whether the operation information carried in the processing request is of the shareable type by using a second function in a second component of the operating system; and determining that the operation information is information of the shareable type in response to the verification being passed;

parsing data to-be-shared from the operation information in response to the operation information being information of the shareable type;

generating sharing information request that includes data to-be-shared based on the operation instruction; and transmitting the sharing information request comprising the data to-be-shared to the terminal, so that the terminal shares the data to-be-shared to a target social application.

10. The information processing method according to claim 9, wherein the cloud game integrates a service component and an interception component, and before the parsing, the method further comprises:

performing interception processing on a sharing interface in the service component by using the interception component; and determining that the operation information is information of the shareable type in response to intercepting the operation information at the sharing interface.

11. The information processing method according to claim 9, wherein the method further comprises:
   executing a processing service corresponding to the operation information in response to the operation information being information of a non-shareable type, to obtain a processing result; and
   transmitting the processing result to the terminal.

12. The information processing method according to claim 9, wherein the terminal shares the data to-be-shared to the target social application by:
   generating, by the terminal, invocation information based on the sharing information request that includes the data to-be-shared;
   starting, by the terminal, the target social application corresponding to the invocation information by using a start function in a management component of an operating system; and
   sharing, by the terminal, the data to-be-shared in the invocation information to the target social application.

13. An information processing system, comprising a terminal and a server,
   the terminal being configured to log in to a cloud game installed in the server based on a trigger instruction of a cloud game login portal, and to obtain an operation instruction during the cloud game, and transmit the operation instruction to the server on which the cloud game is installed;
   the server being configured to receive an operation instruction during a cloud game from the terminal, generate operation information based on the operation instruction, verify whether the operation information is of a shareable type by using an operating system, parse data to-be-shared from the operation information in response to the operation information being information of a shareable type, generate sharing information request with the data to-be-shared, and transmit the sharing information request with the data to-be-shared to the terminal, wherein the verify further comprises:
      initiating a processing request for the operation information by using a first function in a first component of the operating system, the processing request carrying the operation information;
      verifying whether the operation information carried in the processing request is of the shareable type by using a second function in a second component of the operating system; and
      determining that the operation information is information of the shareable type in response to the verification being passed; and
   the terminal being further configured to receive the sharing information request comprising the data to-be-shared transmitted by the server, and to share the data to-be-shared to a target social application.

14. The information processing system of claim 13, wherein the sharing of the data to-be-shared to the target social application by the terminal includes the terminal being further configured to:
   generate invocation information based on the sharing information request that includes the data to-be-shared;
   start the target social application corresponding to the invocation information by using a start function in a management component of an operating system; and
   share the data to-be-shared in the invocation information to the target social application.

15. The information processing system of claim 13, wherein the sharing to the target social application further includes the terminal being further configured to:
   redirect a display page of the target social application to a first interaction page; and
   share the data to-be-shared to a second interaction page of the target social application based on a confirmation instruction in the first interaction page, the second interaction page being an interaction page matching confirmation information carried in the confirmation instruction.

* * * * *